US012533686B2

(12) United States Patent
Tabor et al.

(10) Patent No.: US 12,533,686 B2
(45) Date of Patent: Jan. 27, 2026

(54) DEVICE FOR EXTINGUISHING ELECTRIC BATTERY FIRES

(71) Applicants: John Tabor, Paramus, NJ (US); Kenneth Ehrenberg, Paramus, NJ (US); Kevin Sheehan, Paramus, NJ (US); Stephen Zisa, Paramus, NJ (US)

(72) Inventors: John Tabor, Paramus, NJ (US); Kenneth Ehrenberg, Paramus, NJ (US); Kevin Sheehan, Paramus, NJ (US); Stephen Zisa, Paramus, NJ (US)

( * ) Notice: Subject to any disclaimer, the term of this patent is extended or adjusted under 35 U.S.C. 154(b) by 366 days.

(21) Appl. No.: 18/194,889

(22) Filed: Apr. 3, 2023

(65) Prior Publication Data

US 2023/0311136 A1 Oct. 5, 2023

Related U.S. Application Data

(60) Provisional application No. 63/326,349, filed on Apr. 1, 2022.

(51) Int. Cl.

| | |
|---|---|
| ***B05B 1/20*** | (2006.01) |
| ***A62C 3/07*** | (2006.01) |
| ***A62C 3/16*** | (2006.01) |
| ***B05B 15/63*** | (2018.01) |

(52) U.S. Cl.

CPC .................. *B05B 1/20* (2013.01); *A62C 3/07* (2013.01); *A62C 3/16* (2013.01); *B05B 15/63* (2018.02)

(58) Field of Classification Search

CPC .. B05B 1/14; B05B 1/20; B05B 15/63; A62C 3/07; A62C 3/16; A62C 31/22

USPC ....... 239/273, 275, 279, 242, 525, 530, 531, 239/532, 556, 558, 560, 561, 566–568, 239/DIG. 6; 169/62, 70

See application file for complete search history.

(56) References Cited

U.S. PATENT DOCUMENTS

| | | | | |
|---|---|---|---|---|
| 2,993,650 A * | 7/1961 | Badberg | B05B 1/14 239/560 |
| 3,212,719 A | 10/1965 | Di Corpo | |
| 4,219,084 A * | 8/1980 | Frosch | A62C 31/22 169/70 |
| 4,600,153 A * | 7/1986 | Stone | F28G 1/166 239/560 |
| 4,802,535 A * | 2/1989 | Bakke | A62C 31/22 239/567 |
| 5,152,345 A * | 10/1992 | Yarlott, Jr. | A62C 99/0018 169/70 |
| 5,547,129 A | 8/1996 | Fortunato et al. | |
| 6,668,939 B2 * | 12/2003 | Schmidt | A62C 31/05 239/567 |
| 7,017,832 B1 * | 3/2006 | Nelson | A62C 31/22 239/525 |
| 2012/0292410 A1 | 11/2012 | Chen et al. | |

(Continued)

OTHER PUBLICATIONS

International Search Report of International Application No. PCT/US23/65268 dated Jun. 26, 2023.

*Primary Examiner* — Steven J Ganey
(74) *Attorney, Agent, or Firm* — POLSINELLI PC

(57) ABSTRACT

A device for extinguishing fires or preventing thermal runaway and methods of use thereof are described herein. The device may include a body having a plurality of holes, a neck, and a cap, and one or more hooks. The device may be used for extinguishing a fire or preventing thermal runaway in an electric vehicle fire.

20 Claims, 15 Drawing Sheets

(56) References Cited

U.S. PATENT DOCUMENTS

| | | | |
|---|---|---|---|
| 2016/0023026 | A1 | 1/2016 | Cordani |
| 2019/0240681 | A1 | 8/2019 | Cheng |

* cited by examiner

DEVICE FOR EXTINGUISHING ELECTRIC BATTERY FIRES

CROSS-REFERENCE TO RELATED APPLICATIONS

This application claims the benefit under 35 U.S.C. § 119(e) to U.S. Provisional Application 63/326,349, filed Apr. 1, 2022, the entire contents of which are incorporated herein by reference in their entirety.

FIELD

The present disclosure relates generally to a device for use in extinguishing fires and reducing thermal runaway. In at least one example, the present disclosure relates to a device having a body having a plurality of holes, a neck, and a cap, and one or more hooks.

BACKGROUND

With the advent of Battery Electric Vehicles, firefighters and people across the world now face a new obstacle to fighting vehicle fires. The Rice Applicator Nozzle designed by firefighters is a cost-effective tool that will aid in the extinguishment of fires occurring in these vehicles.

BEV registrations in the United States increased almost 118% when comparing the first half of 2020 to the first half of 2021, from 98,351 in 2020 (H1) to 241,111 in 2021 (H1). While Tesla appears to dominate the market, other brands include Audi, BMW, Chevrolet and other BEV manufactures as understood by a person of ordinary skill in the art. These numbers will increase significantly as the current presidential administration is pushing for half of all new vehicles to be electric by 2030.

According to the NFPA there were 212,500 vehicle fires in 2018 encompassing all varieties of vehicles, gasoline, diesel, and electric. This resulted in over $1.9 billion in property damage in the United States. These vehicle fires also caused 1,500 injuries and 560 fatalities. It also appears there is evidence that BEVs have a higher rate of a fire erupting than traditional gas fueled vehicles. “Fleet Auto News” reported that a 2019 London Fire Brigade record suggests that traditional gas fueled vehicles had an incident rate of 0.04% while the incident rate for BEVS was double at 0.1%.

The obstacle to fighting fires in BEVs is caused by the vehicle’s power source, namely, their lithium-ion batteries. Lithium-ion batteries, when overheated, produce their own oxygen source which then produces a self-sustaining fire. Fires caused by damaged lithium-ion batteries are very difficult to extinguish and require large volumes of water to be applied directly to the batteries underneath the vehicle. While most vehicle fires can be extinguished with 500 gallons of water, fires involving BEVs have required amounts up to 30,000 gallons of water. The main challenge is getting water directly onto the batteries in order to cool them down enough that they stop producing a self-sustaining fire. Self-sustaining fires cause thermal runaway, greatly increasing the heat of the fire and making the fire much more difficult to extinguish. Therefore, there is a need for a device to cool the battery directly to prevent thermal runaway.

Some experts have suggested expensive solutions such as buying cranes and dumpster boxes which are then used to totally submerse the burning vehicles in these water-filled containers. Tesla has publicly stated that this method is not advisable and that fire departments should only apply copious amounts of water to these fires.

Moreover, many other types of fires can be more easily extinguished by dispersing water from underneath the fire. However, there currently are not any nozzles or devices on the market capable of being maneuvered underneath fires when the clearance underneath the fire is very low. Therefore, there is a need for the device as described in this patent application.

As presented herein, a device has been developed to overcome these problems.

BRIEF SUMMARY

Various embodiments are listed below. It will be understood that the embodiments listed below may be combined not only as listed, but in other suitable combinations in accordance with the spirit and scope of the invention.

A first embodiment relates to a device for extinguishing a fire comprising: a body comprising: a neck having male threading at a distal end of the body; a cap at a proximal end of the body; a plurality of holes operable to disperse water wherein: a first column of the plurality of holes has an angular offset of 40 degrees; a second column of the plurality of holes has an angular offset of 20 degrees; a third column of the plurality of holes has no angular offset; a fourth column of the plurality of holes has an angular offset of 20 degrees; a fifth column of the plurality of holes has an angular offset of 40 degrees; a first hook connected to the cap at the proximal end of the body comprising: two ends connected to and extending out from the cap; a U-shaped portion extending out from the two ends; a second hook connected to a first longitudinal side of the body near the distal end of the body comprising: two ends attached to the first longitudinal side of the body near the distal end and extending out from the first longitudinal side of the body near the distal end of the body; a U-shaped portion extending out from the two ends; a third hook connected to a second longitudinal side of the body near the distal end comprising: two ends connected to the second longitudinal side of the body near the distal end of the body and extending out from the second longitudinal side of the body near the distal end of the body; and a U-shaped portion extending out from the two ends.

In a second embodiment, the device of the first may be modified to further comprise an adapter having a distal female threaded end and a proximal female threaded end.

In a third embodiment, the device of the first or second embodiments may be modified wherein the distal female threaded end of the adapter is operable to removably couple to the male threading at the distal end of the body.

In a fourth embodiment, the device of the first through third embodiments may be modified wherein the U-shaped portion of the first hook has a first hook elevation angle from the two ends of the first hook of about 15 degrees to about 30 degrees.

In a fifth embodiment, the device of the first through fourth embodiments may be modified wherein the U-shaped portion of the second hook has a second hook elevation angle from the two ends of the second hook of about 15 degrees to about 30 degrees.

In a sixth embodiment, the device of the first through fifth embodiments may be modified wherein the U-shaped portion of the third hook has a third hook elevation angle from the two ends of the third hook of about 15 degrees to about 30 degrees.

In a seventh embodiment, the device of the first through sixth embodiments may be modified wherein the U-shaped portion of the second hook has a second hook horizontal offset angle from the two ends of the second hook of about 15 degrees to about 30 degrees.

In an eighth embodiment, the device of the first through seventh embodiments may be modified wherein the U-shaped portion of the third hook has a third hook horizontal offset angle from the two ends of the third hook of about 15 degrees to about 30 degrees.

In a ninth embodiment, the device of the first through eighth embodiments may be modified wherein the adapter is a female swivel coupling.

In a tenth embodiment, the device of the first through ninth embodiments may be modified wherein the device has a width of about 6 inches, a height of about 2.25 inches, and a length of about 48 inches.

In an eleventh embodiment, the device of the first through tenth embodiments may be modified wherein the first column, third column, and fifth column have about 20 to 25 holes.

In a twelfth embodiment, the device of the first through eleventh embodiments may be modified wherein the second column and fourth column have about 20 to 25 holes and are offset from the first column, third column, and fifth column.

In a thirteenth embodiment, the device of the first through thirteenth embodiments may be modified wherein the distal female threaded end is operable to removably couple to a fire hosing having a diameter of about 2.5 inches to about 3 inches.

In a fourteenth embodiment, the device of the first through thirteenth embodiments may be modified wherein the device has a weight of about 25 pounds to about 50 pounds and is operable to be operated by one person.

In a fifteenth embodiment, the device of the first through fourteenth embodiments may be modified wherein the first hook, second hook, and third hook are operable to be hooked on to by a Pike pole or New York hook.

In a sixteenth embodiment, the device of the first through fifteenth embodiments may be modified to further comprise an inner baffle support.

In a seventeenth embodiment, the device of the first through sixteenth embodiments may be modified wherein the plurality of holes comprises 108 holes.

In an eighteenth embodiment, the device of the first though seventeenth embodiments may be modified wherein the device is configured to deliver about 700 gallons of water per minute to an underside of a vehicle at a pressure of about 75 psi.

A nineteenth embodiment relates to a device for extinguishing a fire comprising: a body comprising: a neck having male threading at a distal end of the body; a cap at a proximal end of the body; a plurality of holes operable to disperse water wherein: a first column of the plurality of holes has an angular offset of 40 degrees; a second column of the plurality of holes has an angular offset of 20 degrees; a third column of the plurality of holes has no angular offset; a fourth column of the plurality of holes has an angular offset of 20 degrees; a fifth column of the plurality of holes has an angular offset of 40 degrees; a first hook connected to the cap at the proximal end of the body comprising: two ends connected to the cap and extending out from the cap; a U-shaped portion extending from the two ends having an elevation angle of about 15 degrees to about 30 degrees; a second hook connected to a first longitudinal side of the body near the distal end of the body comprising: two ends attached to the first longitudinal side of the body and extending out from the first longitudinal side of the body near the distal end of the body; a U-shaped portion extending out from the two ends having a second hook elevation angle of about 15 degrees to about 30 degrees; a third hook connected to a second longitudinal side of the body near the distal end of the body comprising: two ends attached to a second longitudinal side of the body and extending out from the second longitudinal side of the body near the distal end of the body; and a U-shaped portion extending out from the two ends having a third hook elevation angle of about 15 degrees to about 30 degrees.

A twentieth embodiment relates to a device for extinguishing a fire comprising: a body comprising: a neck having male threading at a distal end of the body; a cap at a proximal end of the body; and a plurality of holes operable to disperse water wherein: a first column of the plurality of holes has an angular offset of 40 degrees; a second column of the plurality of holes has an angular offset of 20 degrees; a third column of the plurality of holes has no angular offset; a fourth column of the plurality of holes has an angular offset of 20 degrees; a fifth column of the plurality of holes has an angular offset of 40 degrees; the holes in the first column, third column, and fifth column being offset from the holes in the second column and fourth column; a first hook connected to the cap at the proximal end of the body comprising: two ends attached to and extending out from the cap; and a U-shaped portion extending from the two ends having a first hook elevation angle of about 15 degrees to about 30 degrees; a second hook connected to a first longitudinal side of the body near the distal end of the body comprising: two ends connected to the first longitudinal side of the body near the distal end of the body and extending out from the first longitudinal side of the body near the distal end of the body; and a U-shaped portion extending out from the two ends having a second hook elevation angle of about 15 degrees to about 30 degrees and a second hook horizontal offset angle of about 15 degrees to about 30 degrees; a third hook connected to a second longitudinal side of the body near the distal end of the body comprising: two ends connected to the second longitudinal side of the body near the distal end of the body and extending out from the second longitudinal side of the body near the distal end of the body; and a U-shaped portion extending out from the two ends having a third hook elevation angle of about 15 degrees to about 30 degrees and a second hook horizontal offset angle of about 15 degrees to about 30 degrees, wherein the device has a height of about 2.25 inches, a width of about 6 inches, and a length of about 48 inches.

Other aspects and iterations of the invention are described more thoroughly below.

BRIEF DESCRIPTION OF THE DRAWINGS

Implementations of the present technology will now be described, by way of example only, with reference to the attached figures, wherein.

DETAILED DESCRIPTION

Figure 1:
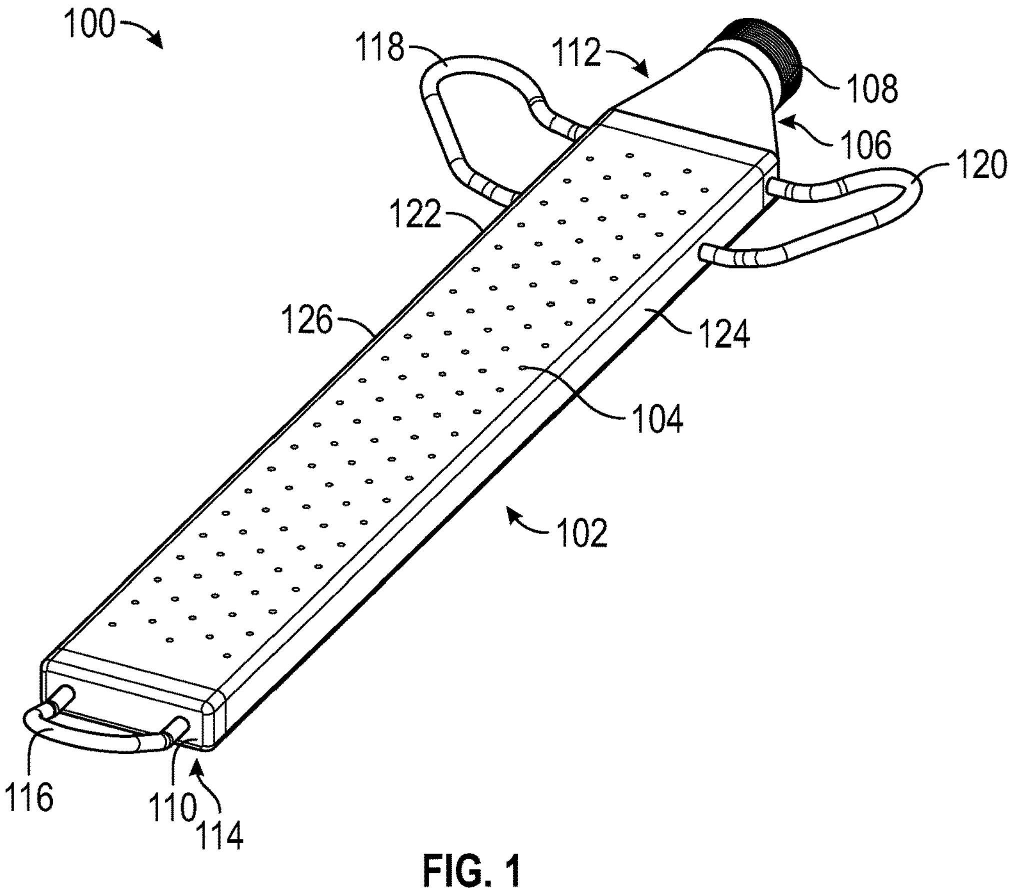
FIG. 1 is an isometric view of the device in one example.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout the above disclosure will now be presented. As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, "substantially cylindrical" means that the object resembles a cylinder but can have one or more deviations from a true cylinder.

The terms "attached" and "connected" are used interchangeably in this disclosure. The terms "attached" and "connected" mean to be connected.

The terms "comprising," "including" and "having" are used interchangeably in this disclosure. The terms "comprising," "including" and "having" mean to include, but not necessarily be limited to the things so described.

For purposes of this patent application, Battery Electric Vehicles ("BEVs") are defined broadly to include all electric vehicles as manufacturers of hybrid, fuel cell, and any other future technology that may place batteries under the vehicles as described below.

Provided herein is a device for extinguishing fires and preventing or reducing thermal runaway. The Rice Applicator Nozzle ("device") was invented by a group of New Jersey firefighters who began thinking of ways to address this new vehicle fire dilemma. The device is designed to be pushed or pulled underneath the center of a burning electric vehicle or other burning object, where the largest amount of water needs to be applied. In the case of a burning electric vehicle the largest amount of water is applied directly to the battery components themselves with the device. The device is easily pushed or pulled into position using a standard size Pike pole or New York hook (not shown but understood by a person of ordinary skill in the art especially any firefighter as every fire truck typically has a Pike pole or New York hook thereon). The device is designed to connect to a hose via a first coupling (e.g., adapter). When connected to, for example, a 3-inch supply line, the device safely provides approximately 700 gallons a minute of water directly to the burning battery or the underside of a burning object where the water is needed most. This direct application of water will quickly start a cooling process that is significantly more effective than the old standard method of only flowing water downward from the inside or top of an internal-combustion-engine vehicle (ICEV) fire with a standard vehicle fire hose line. The device has no moving parts and is simple to use. When used in conjunction with a traditional vehicle fire line, BEV fires will be extinguished more quickly, and with less water, as compared to standard vehicle firefighting tools and tactics, currently used by most fire departments. The device may prevent thermal runaway of a battery fire, greatly decreasing the water and time necessary to put out a fire. In an example, the device may be a low-profile appliance.

Figure 18:
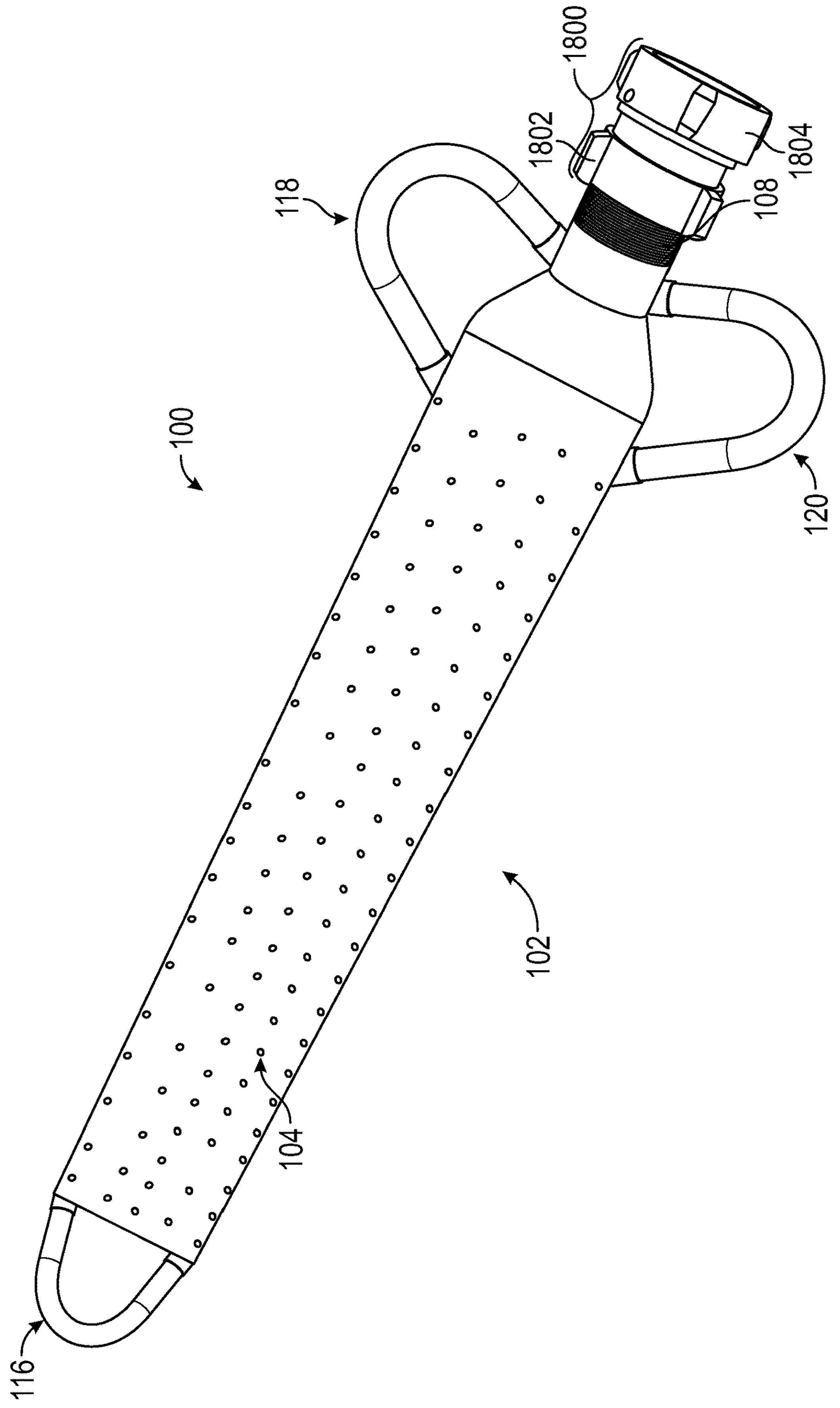
FIG. 18 is an isometric view of the device in one example.

As shown in FIG. 1, the device 100 may include a body 102. The body 102 may have a plurality of holes 104 operable to disperse water. In an example the body may include a neck 106 having a male threading 108 at a distal end 112 of the body 102. The body 102 may have a cap 110 at the proximal end 114 of the body 102. The male threading 108 at the distal end 112 of the body 102 may be operable to removably couple to an adapter 1800 (as illustrated, for example, in FIG. 18). The adapter 1800 may be a female swivel coupling having a distal female threaded end 1804 and a proximal female threaded end 1802. The distal female threaded end 1804 may be operable to removably couple to a hose (e.g., firehose, garden hose, or other type of hose). The distal female threaded end 1804 of the female swivel coupling may be operable to removably couple to a 1 inch hose, a 1.5 inch hose, a 1.75 inch hose, a 2 inch hose, a 2.25 inch hose, a 2.5 inch hose, a 2.75 inch hose, or a 3 inch hose. The proximal female threaded end 1802 of the adapter 1800 may be operable to removably couple to the male threading 108 of the neck 106 at the distal end 112 of the body 102.

In some embodiments, the midsection 126 of the body 102, the neck 106, the cap 110, and the adapter 1800 may be made of the same material, including but not limited to steel, titanium, or aluminum. In an example, the body 102 may be made of the same material, including but not limited to steel, titanium, or aluminum. In an example, the adapter 1800 may be made of a different material than the body 102, including but not limited to steel, titanium, or aluminum. In another example, the midsection 126 of the body 102, the neck 106, the cap 110, and the adapter 1800 may all be made of different materials.

In some embodiments, the device 100 may include one, two, three, four, or five hooks. In an example, the device 100 may include one hook. In an example, the device 100 may include two hooks. In an example, the device 100 may include three hooks. In a further example, the device 100 may include three or more hooks. In an additional example, the device 100 may have three to six hooks.

Figure 2:
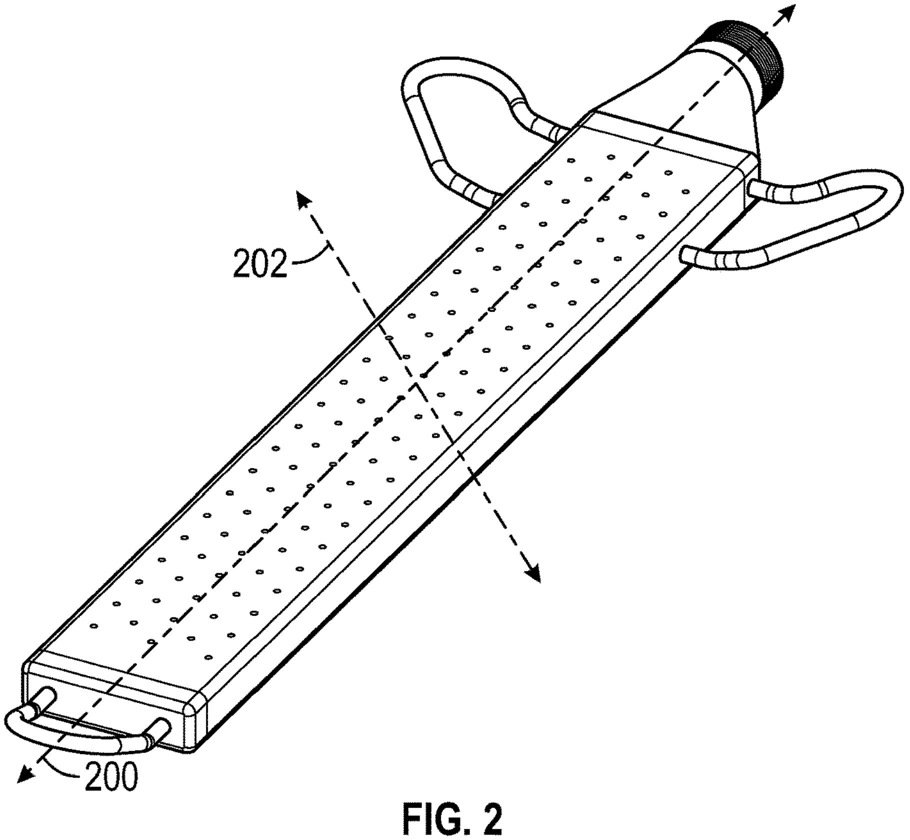
FIG. 2 is an isometric view of the device showing a vertical and horizontal axis.

As illustrated in FIG. 1, the device may include three hooks. The device may include a first hook 116, a second hook 118, and a third hook 120. The first hook 116 may be connected (e.g., welded) to the cap 110. The second hook 118 may be connected (e.g., welded) to a first longitudinal side 122 of the body 102 near the distal end 112 of the body 102. The third hook 120 may be connected (e.g., welded) to a second longitudinal side 124 of the body near the distal end 112 of the body 102. As illustrated in FIG. 2, the device 100 includes a longitudinal axis 200 and a vertical axis 202.

Figure 3:
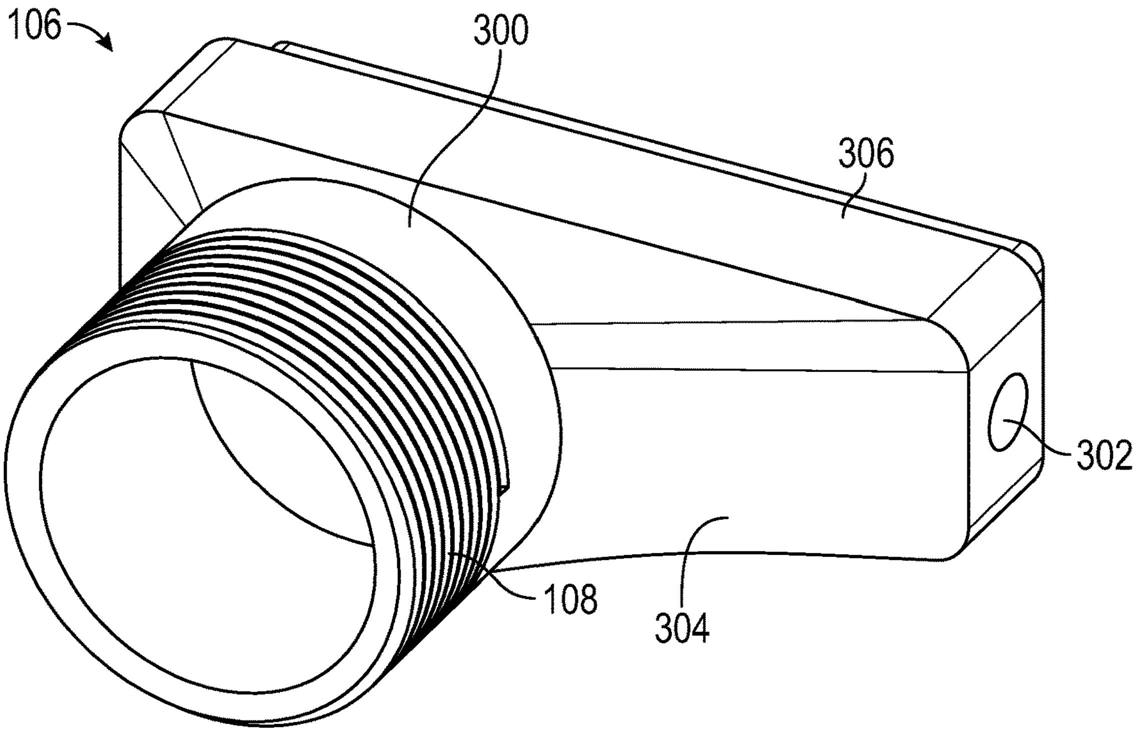
FIG. 3 is an isometric view of a neck in one example.

As illustrated in FIG. 3, the neck 106 may include a male threading 108 manufactured on a pipe portion 300. The neck 106 may include a second hook hole 302 and a third hook hole (not shown). The second hook hole 302 and the third hook hole may be drilled into the neck 106. In an example, the second hook hole 302 and the third hook hole may be formed in the neck 106 using common manufacturing techniques. In an example, the second hook hole 302 and the third hook hole may be operable to receive an end of the second hook 118 and an end of the third hook 120. The neck may have a funnel portion 304 for evenly dispersing water into the midsection 126 of the body 102. The funnel portion may allow water to flow through the neck 106 and into the midsection 126 of the body 102 and be evenly distributed between the plurality of holes 104. The neck may have a rectangular portion 306 for connecting to the midsection 126 of the body 102.

In an embodiment, the neck 106 may be welded to the midsection 126 of the body 102. In a further example, the neck 106 may be formed as a part of the body 102 using traditional manufacturing techniques. The pipe portion 300 may be welded on to the neck 106. The pipe portion 300 may be manufactured with the neck 106 as one part.

Figure 19:
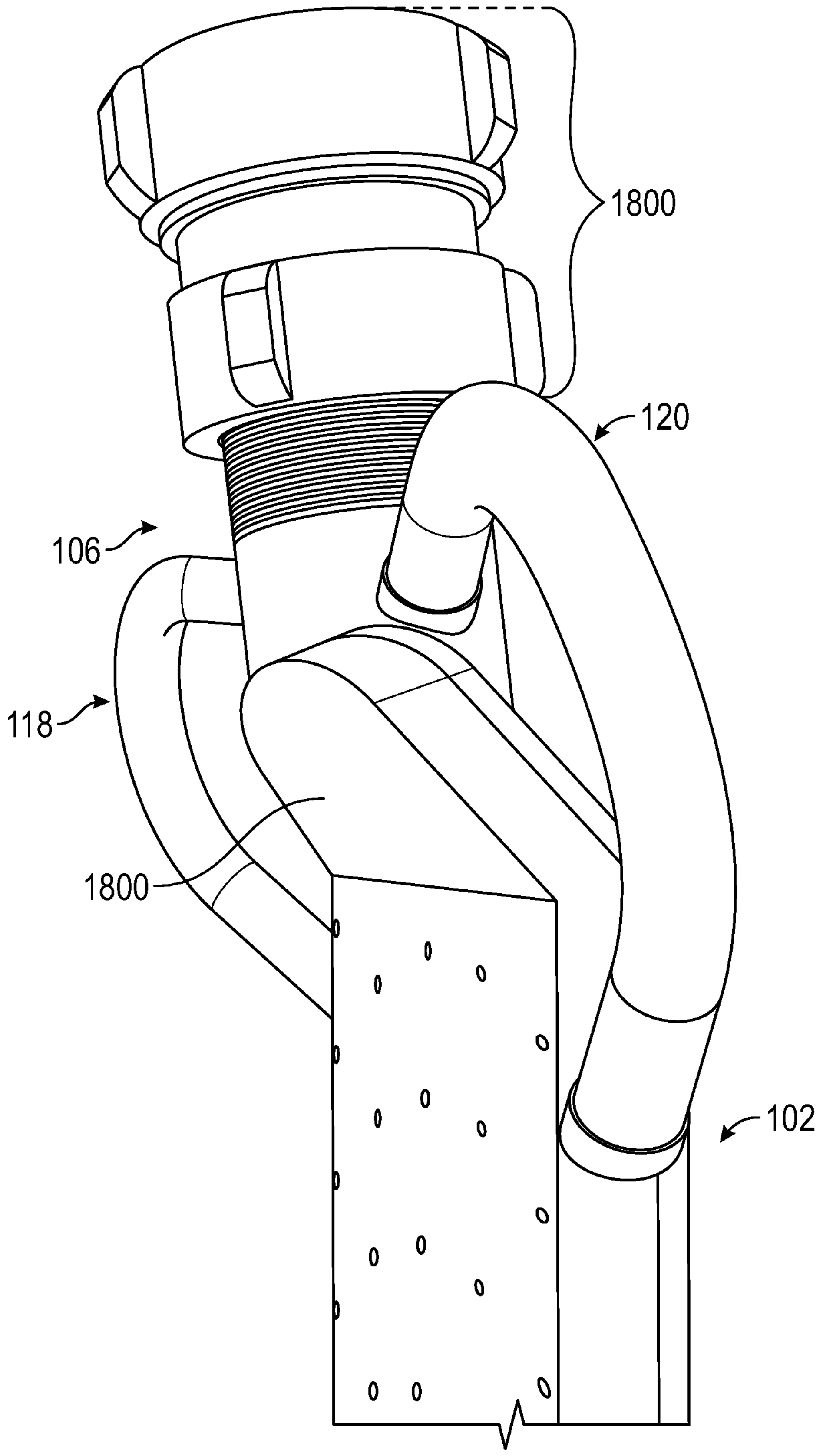
FIG. 19 is a side view of a cross-section of the device in another example.

In an embodiment, the body 102 may include an inclined portion 1900, as illustrated, for example, in FIG. 19. The inclined portion 1900 of the body 102 may have an incline angle of about 5 degrees, about 10 degrees, about 15 degrees, about 20 degrees, about 25 degrees, about 30 degrees, about 35 degrees, about 40 degrees, or about 45 degrees. In an example, the inclined portion 1900 of the body 10 may have an incline angle of about 5 degrees to about 20 degrees, about 20 degrees to about 30 degrees, or about 30 degrees to about 45 degrees.

Figure 11:
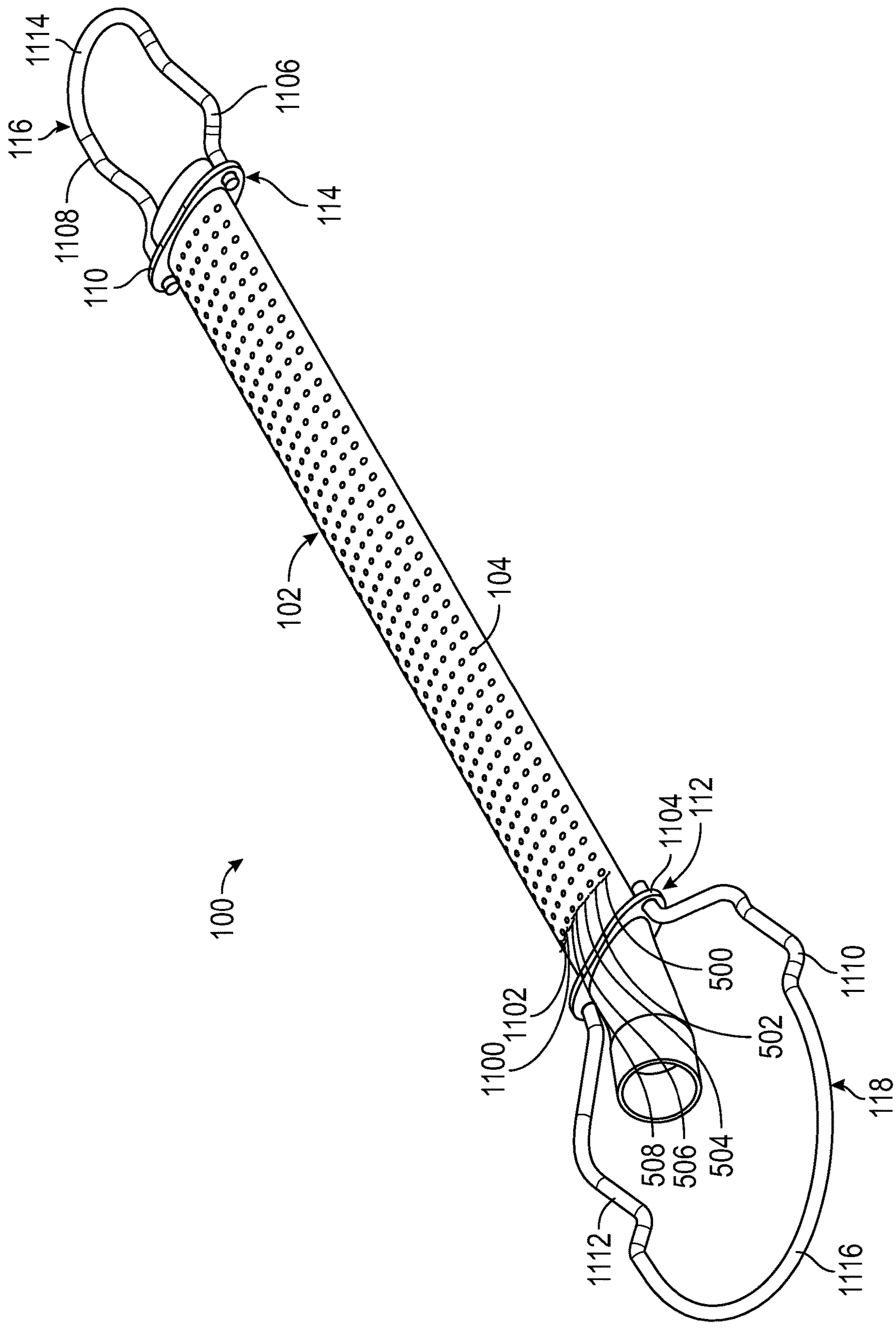
FIG. 11 is an isometric view of a device in one example.
Figure 13:
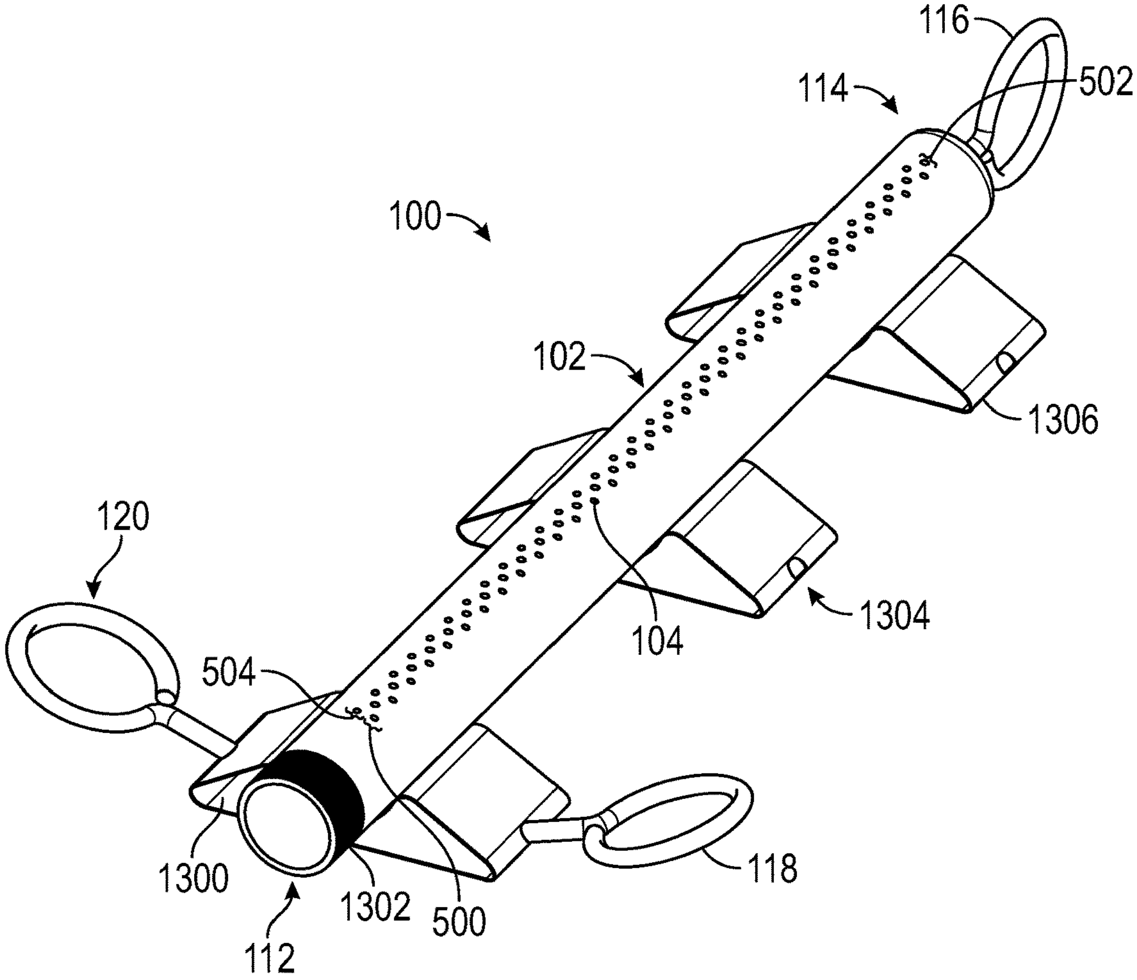
FIG. 13 is an isometric view of a device in one example.
Figure 14:
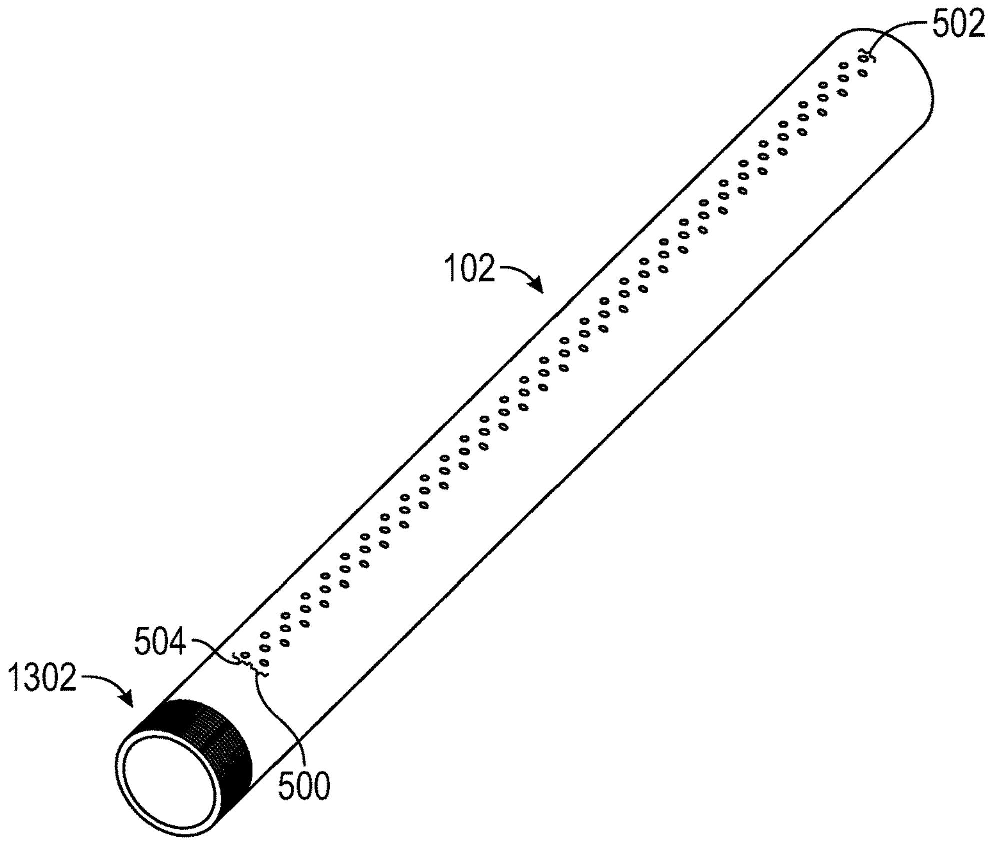
FIG. 14 is an isometric view of a body in one example.

As illustrated in FIG. 1, the body 102 may be substantially rectangular. Alternatively, as illustrated in FIG. 11, the body 102 may be tubular in shape. As illustrated in FIGS. 13-14, the body 102 may be a pipe. As illustrated in FIGS. 13-14, the pipe body may include a male threaded end 1302.

Figure 4:
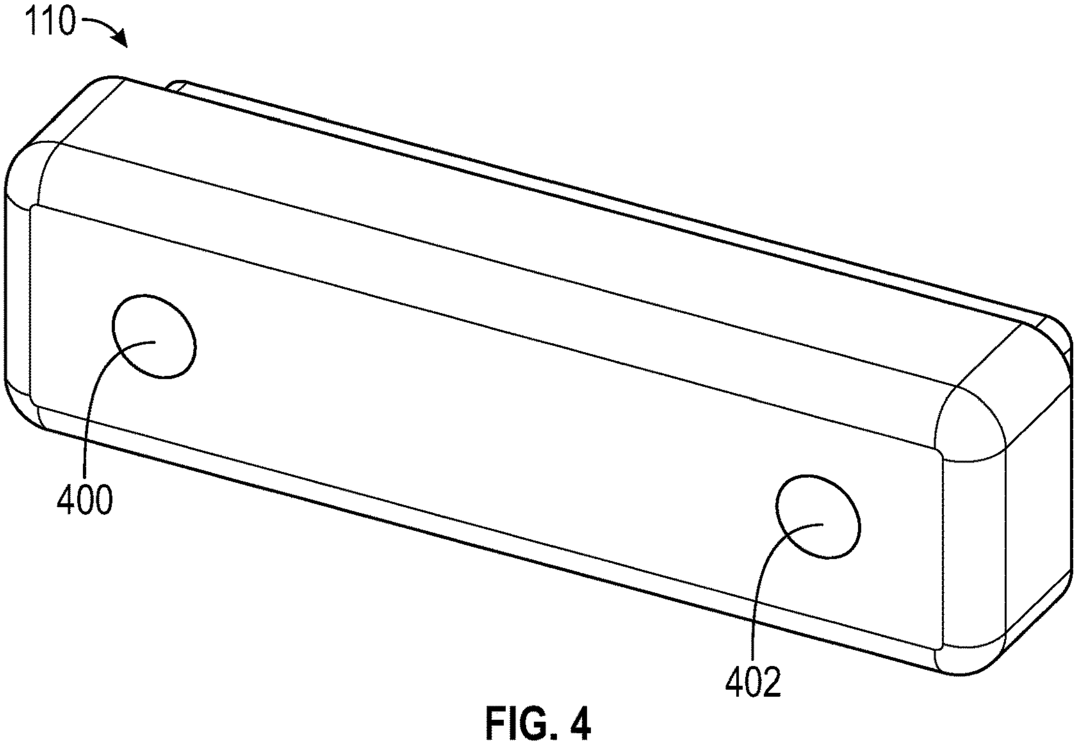
FIG. 4 is an isometric view of a cap in one example.
Figure 15:
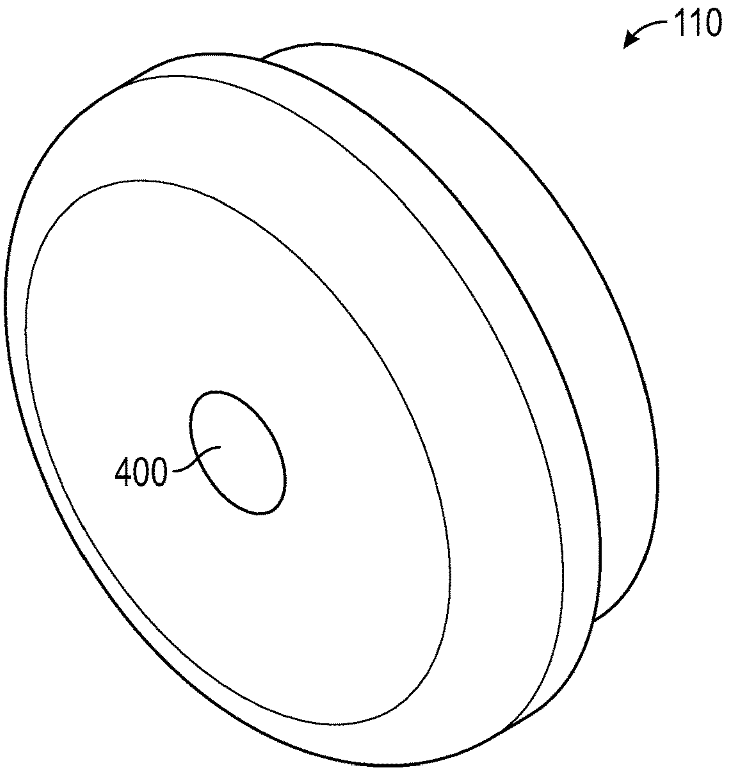
FIG. 15 is an isometric view of a cap in one example.

As illustrated in FIG. 4, the cap 110 may have two first hook holes 400, 402. The first hook holes 400, 402 may be operable to each receive two ends of the first hook 116. The cap 110 may be welded to the midsection 126 of the body 102. In a further example, the cap 110 may be manufactured as part of the body 102. In an example, the cap 110 may be rectangular. In another example, as illustrated in FIG. 15, the cap 110 may be circular. As illustrated in FIG. 15, the cap 110 may have a single first hook hole 400. The cap 110 prevents water from exiting the proximal end 114 of the body 102, and forces water up and out through the plurality of holes 104.

Figure 5:
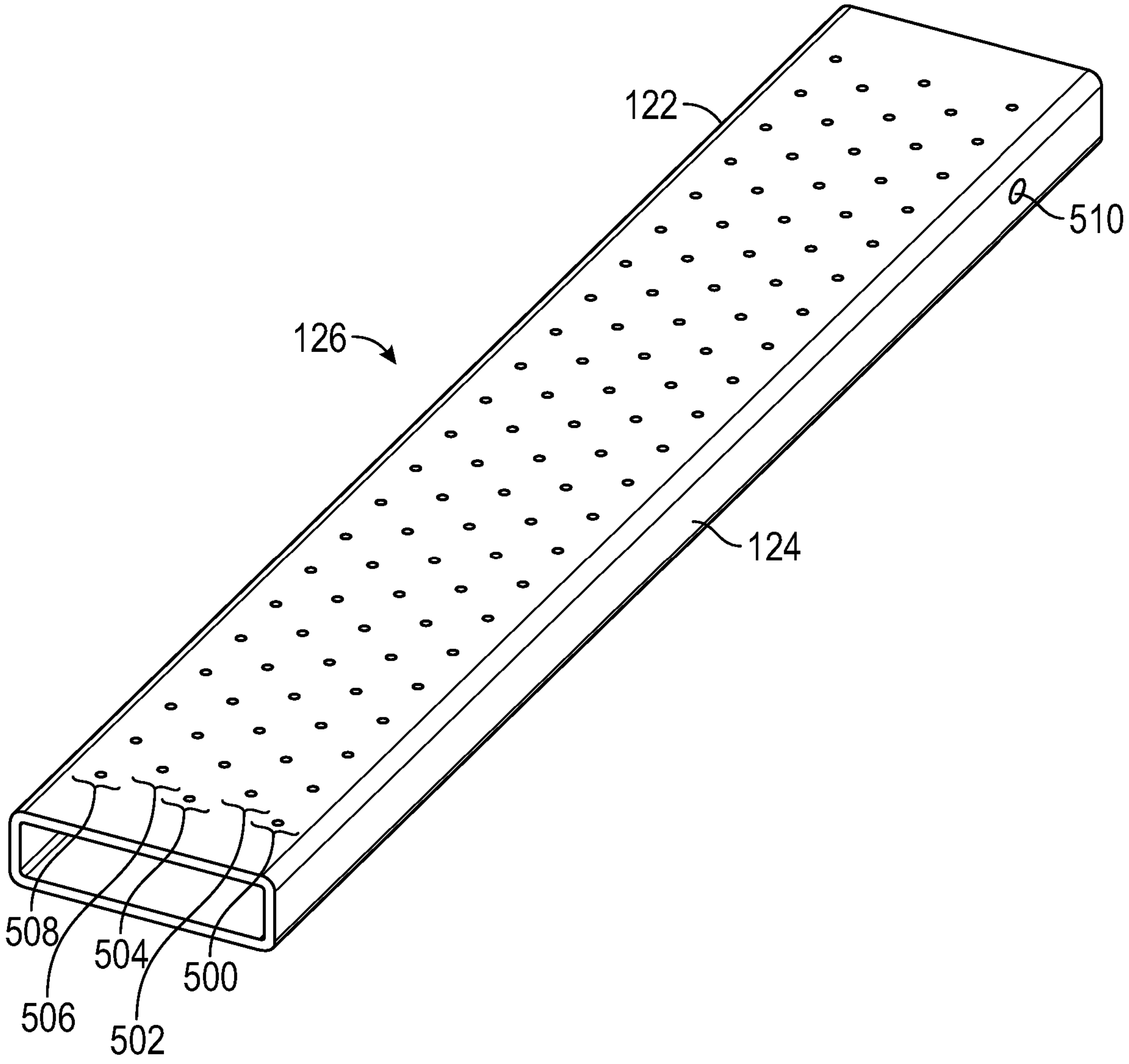
FIG. 5 is an isometric view of the midsection of the body in one example.

As illustrated in FIG. 5, the midsection 126 of the body 102 may have a hole 510 for connecting an end of the third hook 120 on the second longitudinal side 124 near the distal end 112 of the body 102. The midsection 126 of the body 102 may have a hole (not shown) for connecting an end of the second hook 118 on the first longitudinal side 122 near the distal end 112 of the body 102.

In an additional embodiment, the device 100 may further comprise a filter or a strainer attached to the adapter 1800. The filter may be configured to filter water from a water source to ensure no particles enter the body. By filtering the water before the water enters the body 102, potential clogging or corrosion of the holes is reduced or prevented. Further, by filtering the water before the water enters the device 100, clogging or corrosion within neck 106, midsection 126 of the body 102, and at the cap 110 is reduced or prevented.

As illustrated in FIGS. 1, 11, and 13-14, the body 102 may have a plurality of holes 104. In an example, the plurality of holes 104 may be drilled into the body 102. In a further example, the plurality of holes 104 may be formed on the body 102 using traditional manufacturing techniques such as casting. In a further example, the plurality of holes 104 may be formed on the body 102 when the body 102 is manufactured using common manufacturing techniques known in the art. As illustrated, for example, in FIG. 5, the plurality of holes may be on the midsection 126 of the body 102.

In an embodiment, the plurality of holes 104 may comprise about 50 holes, about 60 holes, about 70 holes, about 80 holes, about 90 holes, about 100 holes, about 110 holes, about 120 holes, about 130 holes, about 140 holes, about 150 holes, about 160 holes, about 170 holes, about 180 holes, about 190 holes, about 200 holes, about 210 holes, about 220 holes, about 230 holes, about 240 holes, about 250 holes, about 260 holes, about 270 holes, about 280 holes, about 290 holes, or about 300 holes. In an example, the plurality of holes 104 may comprise about 50 to 100 holes, about 100 to 150 holes, about 150 to 200 holes, or about 250 to 300 holes. As illustrated in FIG. 1, the device may have 108 holes. In a further example, the device may have 113 holes. As illustrated in FIG. 13, the device may have 93 holes. As illustrated in FIG. 11, the device may have 252 holes.

In a further embodiment, the plurality of holes 104 may be arranged in 2 columns, 3 columns, 4 columns, 5 columns, 6 columns, 7 columns, 8 columns, 9 columns, or 10 columns. In an example, the columns may be on the longitudinal axis 200. Each column may be only one hole wide. The plurality of holes 104 may be arranged in columns, each column having an equal number of holes, as illustrated, for example, in FIGS. 11 and 13-14. The plurality of holes 104 may be arranged in columns, each column having an unequal number of holes, as illustrated, for example, in FIG. 18. The plurality of holes may be arranged in columns, wherein some columns may have the same number of holes and some columns may have a different number of holes, as illustrated, for example, in FIG. 1. In an example, the holes in each column may be equally spaced from each other, as well as equally spaced from holes in other columns.

In an additional embodiment, the diameter of each hole may be about 0.1875 inches. In an example, the diameter of each hole may be about 0.1875 inches, about 0.25 inches, about 0.3125 inches, about 0.375 inches, about 0.5 inches, about 0.5625 inches, about 0.625 inches, about 0.6875 inches, about 0.75 inches, about 0.8125 inches, about 0.875 inches, about 0.9375 inches, or about 1 inch. In an example, the diameter of each hole may be about 0.1875 inches to 0.5 inches. In a further example, the diameter of each hole may be about 0.5 inches to 1 inch.

In a further embodiment, as illustrated in FIG. 5, the plurality of holes 104 may be arranged in a first column 500, a second column 502, a third column 504, a fourth column 506, and a fifth column 508. As illustrated in FIG. 5, the first column 500, third column 504, and fifth column 508 may each have 22 equally spaced holes. The second column 502 and the fourth column 506 may each have 21 equally spaced holes. In an example, the first column 500, third column 504, and fifth column 508 may each have 23 equally spaced holes. The second column 502 and the fourth column 506 may each have 22 equally spaced holes. In a further example, the first column 500, third column 504, and fifth column 508 may each have about 15 to about 50 equally spaced holes. The second column 502 and the fourth column 506 may each have about 15 to about 50 equally spaced holes.

As illustrated in FIG. 5, the holes in the first column 500, third column 504, and fifth column 508 may be offset from the holes in the second column 502 and fourth column 506, thereby providing a more uniform dispersion of water. By providing a uniform dispersion of water, the device 100 saves water by expediting the process of extinguishing a fire and/or preventing thermal runaway.

As illustrated in FIG. 11, the plurality of holes 104 may be arranged in a first column 500, a second column 502, a third column 504, a fourth column 506, a fifth column 508, a sixth column 1100, and a seventh column 1102. As illustrated in FIG. 11, each column may have 42 holes. As illustrated in FIG. 11, each hole in the plurality of holes 104 may be equally spaced from each other.

As illustrated in FIGS. 13-14, the plurality of holes 104 may be arranged in a first column 500, a second column 502, and a third column 504. The first column 500 may have 31 holes, the second column 502 may have 31 holes, and the third column 504 may have 31 holes. In an example, the holes in the second column 502 may be offset from the holes in the first column 500 and the third column 504.

In an embodiment, each of the holes in the first column 500 and the fifth column 508 may have an angular offset. In an example, the holes in the first column 500 and the fifth column 508 may be drilled or formed at an angle. The holes in the first column 500 and the fifth column 508 may have an angular offset of about 5 degrees, about 10 degrees, about 15 degrees, about 20 degrees, about 25 degrees, about 30 degrees, about 35 degrees, about 40 degrees, about 45 degrees, about 50 degrees, about 55 degrees, or about 60 degrees. The holes in the first column 500 and fifth column may have an angular offset of about 0 degrees to about 15 degrees, about 15 degrees to about 30 degrees, about 30 degrees to about 45 degrees, or about 45 degrees to about 60 degrees. The angular offset in the holes of the first column 500 and the fifth column 508 may be operable to disperse water in a direction away from or distal to the body 102.

In a further embodiment, the holes in the second column 502 and the fourth column 506 may have an angular offset. The holes in the second column 502 and the fourth column 506 may be drilled at an angle or formed at an angle. The holes in the second column 502 and the fourth column 506 may have an angular offset of about 5 degrees, about 10 degrees, about 15 degrees, about 20 degrees, about 25 degrees, about 30 degrees, about 35 degrees, about 40 degrees, about 45 degrees, about 50 degrees, about 55 degrees, or about 60 degrees. In an example, the holes in the second column 502 and the fourth column 506 may have an angular offset of about 0 degrees to about 15 degrees, about 15 degrees to about 30 degrees, about 30 degrees to about 45 degrees, or about 45 degrees to about 60 degrees. The holes in the second column 502 and fourth column 506 may be operable to disperse water in a direction away from the body 102 or distal to the body 102. In an example the holes in the third column 504 may have no angular offset, or in other words, a zero-degree offset. The holes in the third column 504 may disperse water in an upward direction (e.g., 90 degrees).

In some embodiments, the angular offset of the holes in the first column 500, and second column 502 may be configured to disperse water out from the second longitudinal side 124 and the body 102. In an example, the angular offset of the holes in the fourth column 506 and the fifth column 508 may be configured to disperse water in a direction out from the first longitudinal side 122 and the body 102. The holes in the third column 504 (e.g., the holes having zero angular offset) may be configured to disperse water at a 90-degree angle from the top surface of the body (e.g., the surface having the plurality of holes 104).

In a further embodiment, the holes in the first column 500 may have an angular offset of 40 degrees, the holes in the second column 502 may have an angular offset of 20 degrees, the holes in the third column 504 may have no angular offset, the holes in the fourth column 506 may have an angular offset of about 20 degrees, and the holes in the fifth column 508 may have an angular offset of about 40 degrees. The angular offsets of the columns may provide a more even dispersion of water.

As illustrated in FIG. 1, the device 100 may have three hooks. In an example the device may have one, two, three, four, or five hooks. The device 100 may have a first hook 116, a second hook 118, and a third hook 120. The first hook 116 may have two ends connected to and extending out from the cap 110 at the proximal end 114 of the body 102 in the two first hook holes 400 and 402. The second hook 118 may have two ends connected to and extending out from the first longitudinal side 122 of the body 102 near the distal end 112 of the body 102. The third hook 120 may have two ends connected to and extending out from the second longitudinal side 124 of the body 102 near the distal end 112 of the body.

Figure 6:
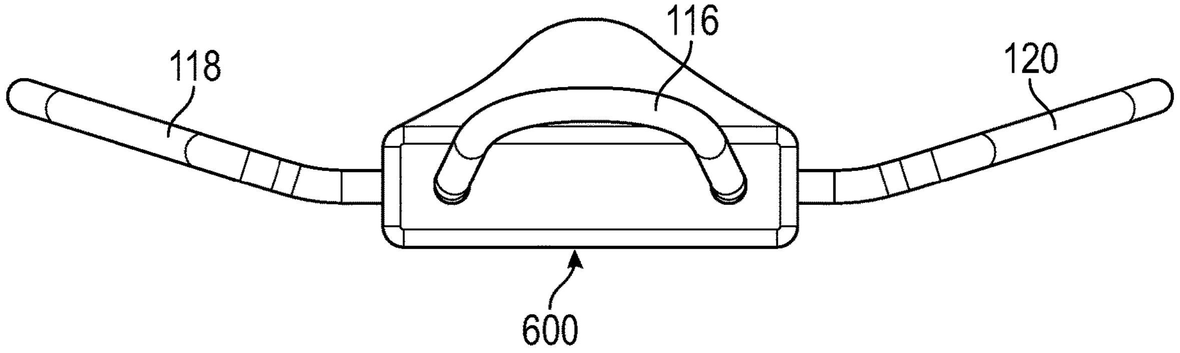
FIG. 6 is a front view of the device in one example.
Figure 7:
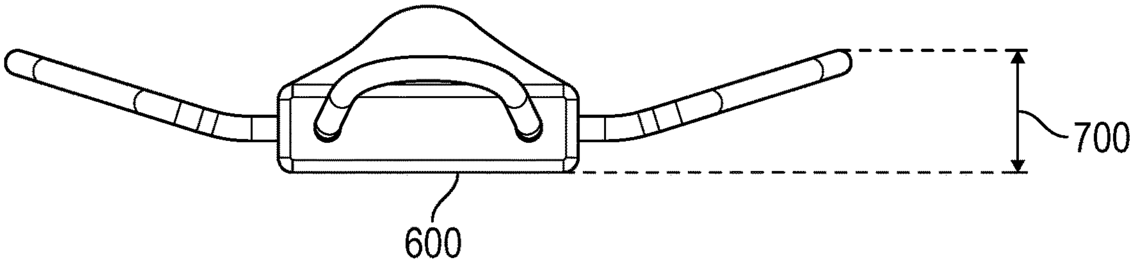
FIG. 7 is a front view of the device in one example.

As illustrated in FIGS. 6 and 7, the first hook 116, the second hook 118, and the third hook 120 may incline at an elevation angle. FIG. 7 shows the maximum height 700 of the second hook 118 and the third hook 120. The maximum height 700 of the second hook 118 and the third hook 120 may be measured from the device bottom surface 600 to the tallest point of the second hook 118 or third hook 120. The maximum height 700 of the second hook 118 and the third hook 120 is the maximum height of the device. In an example, the maximum height 700 of the device may be 2.44 inches. In a further example, the maximum height 700 of the second hook 118 and the third hook 120 may be about 1.5 inches, about 1.75 inches, about 2 inches, about 2.25 inches, about 2.5 inches, about 2.75 inches, about 3 inches, about 3.25 inches, about 3.5 inches, about 3.75 inches, about 4 inches, about 4.25 inches, or about 4.5 inches. In an example, the maximum height 700 of the second hook 118 and the third hook 120 may be about 1 inch to about 1.5 inches, about 1.5 inches to about 2 inches, about 2.5 inches to about 3 inches, about 3.5 inches to about 4 inches, or about 3.5 inches to about 4 inches. The maximum height 700 of the second hook 118 and the third hook 120 is designed such that the device 100 can fit under a vehicle when the vehicle's tires have deflated or exploded due to heat. The maximum height 700 of the second hook 118 and the third hook 120 ensures that the device 100 may still provide water to the underside of a vehicle when there is a low clearance.

In some embodiments, the first hook 116 may be the tallest hook. The first hook 116 may have a maximum height of about 1.5 inches, about 1.75 inches, about 2 inches, about 2.25 inches, about 2.5 inches, about 2.75 inches, about 3 inches, about 3.25 inches, about 3.5 inches, about 3.75 inches, about 4 inches, about 4.25 inches, or about 4.5 inches. In an example, the first hook 116 may have a maximum height of 2.25 inches. In an example, the first hook 116 may have a maximum height of about 1.5 inches to about 2 inches, about 2 inches to about 2.5 inches, about 2.5 inches to about 3 inches, about 3.5 inches to about 4 inches, about 3.5 inches to about 4 inches, or about 4 inches to about 4.5 inches. The maximum height of the first hook 116 may be measured from the device bottom surface 600 to the tallest point of the first hook 116. The maximum height of the first hook 116 is designed such that the device 100 can fit under a vehicle when the vehicle's tires have deflated or exploded due to heat. The maximum height of the first hook 116 ensures that the device 100 may still provide water to the underside of a vehicle when there is a low clearance.

Figure 8A:
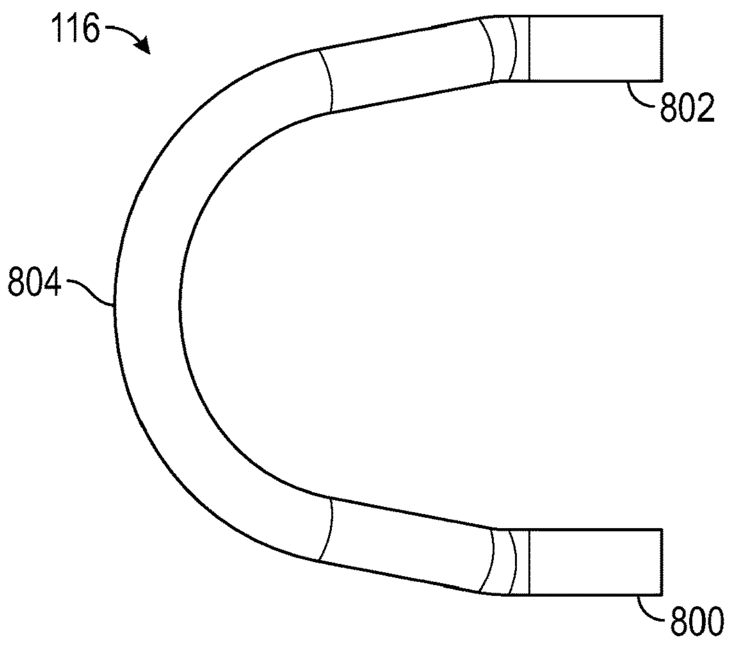
FIG. 8A is a top view of a hook in one example.
Figure 8B:
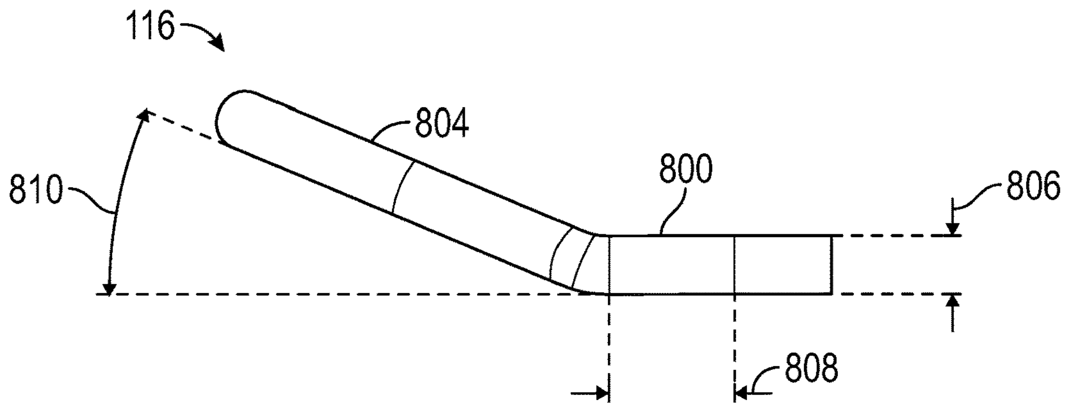
FIG. 8B is a side view of a hook in one example.
Figure 8C:
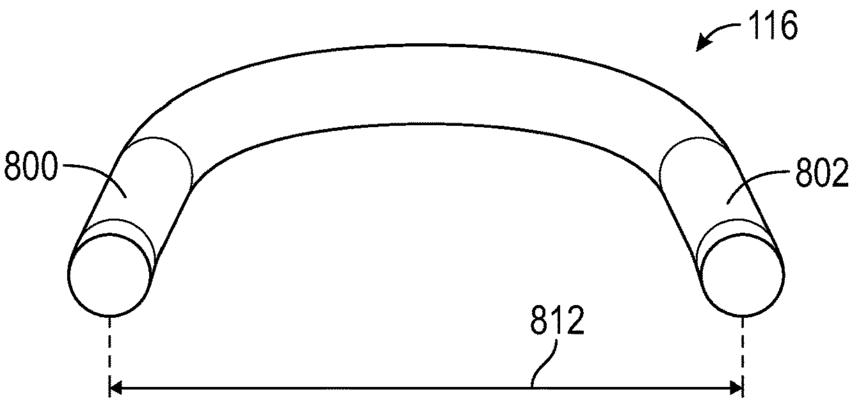
FIG. 8C is a back view of a hook in one example.

FIGS. 8A-8C show the dimensions of the first hook 116. As illustrated in FIG. 8A, the first hook 116 may have two ends and a U-shaped portion. The first hook 116 may have a first straight end 800, a second straight end 802, and a U-shaped portion 804. The first straight end 800 and the second straight end 802 may fit in the first hook holes 400, 402 of the cap 110. The U-shaped portion 804 of the first hook 116 may extend out from the first straight end 800 and the second straight end 802 of the first hook 116.

As illustrated in FIG. 8B, the first hook 116 may have a first hook material diameter 806 of about 0.3 inches, about 0.4 inches, about 0.5 inches, about 0.6 inches, about 0.7 inches, about 0.8 inches, about 0.9 inches, or about 1 inch. In an example, the first hook material diameter 806 may be about 0.3 inches to about 0.6 inches or about 0.6 inches to about 1 inch. The first straight end 800 and the second straight end 802 of the first hook 116 may have a first hook straight end length 808 of about 0.5 inches, about 0.75 inches, about 1 inch, about 1.25 inches, about 1.5 inches, about 1.75 inches, or about 2 inches. In an example, the first hook straight end length 808 may be about 0.5 inches to about 1 inch, about 1 inch to about 1.5 inches, or about 1.5 inches to about 2 inches. The U-shaped portion 804 of the first hook 116 may have a first hook elevation angle 810 (e.g., angle between the straight ends 800, 802 and the U-shaped portion 804) of about 15 degrees, about 20 degrees, about 25 degrees, or about 30 degrees. In an example, the first hook elevation angle 810 may be about 15 degrees to about 20 degrees, about 20 degrees to about 25 degrees, about 25 degrees to about 30 degrees, about 30 degrees to about 35 degrees, about 35 degrees to about 40 degrees, or about 40 degrees to about 45 degrees. In an example, the first hook 116 may have a first hook straight end length 808 of 0.5 inches, a first hook material diameter 806 of about 0.5 inches, and a first hook elevation angle 810 of 22.5 degrees.

As illustrated in FIG. 8C, the first hook maximum width 812 of the first hook 116 (e.g., the distance between the first straight end and the second straight end of the first hook) may be about 2 inches, about 2.5 inches, about 3 inches, about 3.5 inches, about 4 inches, about 4.5 inches, about 5 inches, about 5.5 inches, or about 6 inches. In an example, the first hook maximum width 812 may be about 2 inches to about 2.5 inches, about 2.5 inches to about 3 inches, about 3 inches to about 3.5 inches, about 3.5 inches to about 4 inches, about 4 inches to about 4.5 inches, about 4.5 inches to about 5 inches, about 5 inches to about 5.5 inches, about 5.5 inches to about 6 inches. In an example, first hook maximum width 812 of the first hook 116 may be about 4 inches.

Figure 20:
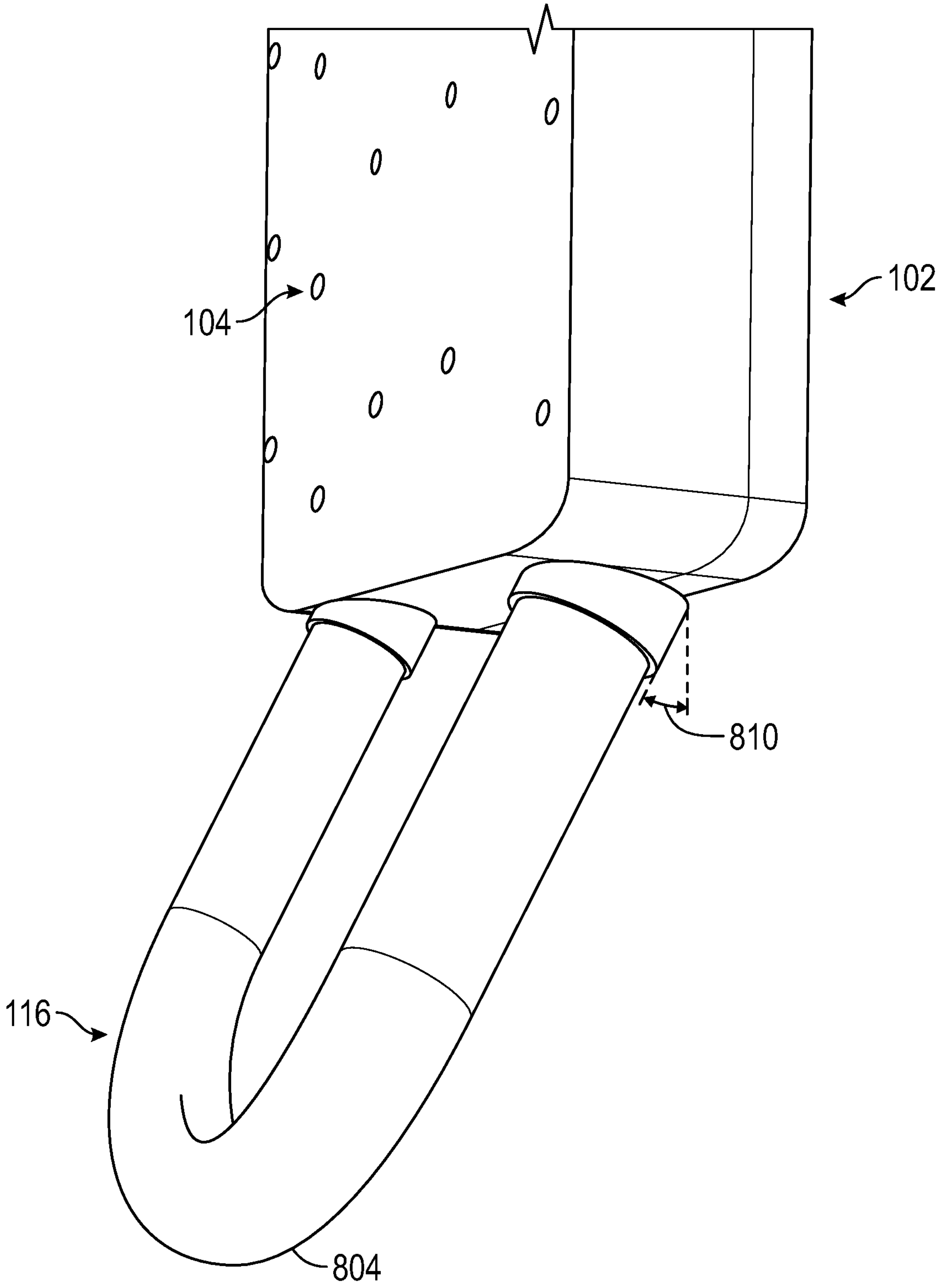
FIG. 20 is a side view of a cross-section of the device in another example.

In some embodiments, as illustrated for example in FIG. 20, the first hook 116 may comprise only the U-shaped portion 804 of the first hook 116. The U-shaped portion 804 of the first hook 116 may have a first hook elevation angle 810 from the proximal end of the body 102.

Figure 9A:
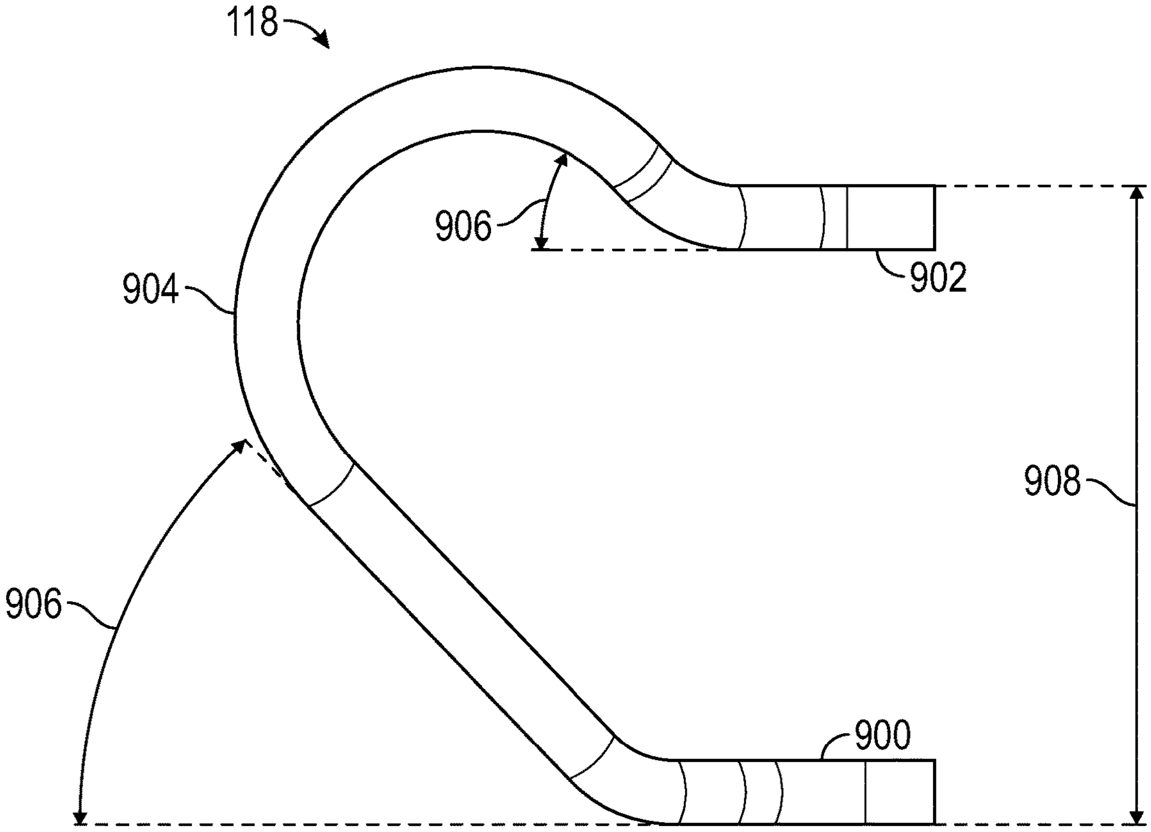
FIG. 9A is a top view of a hook in one example.
Figure 9B:
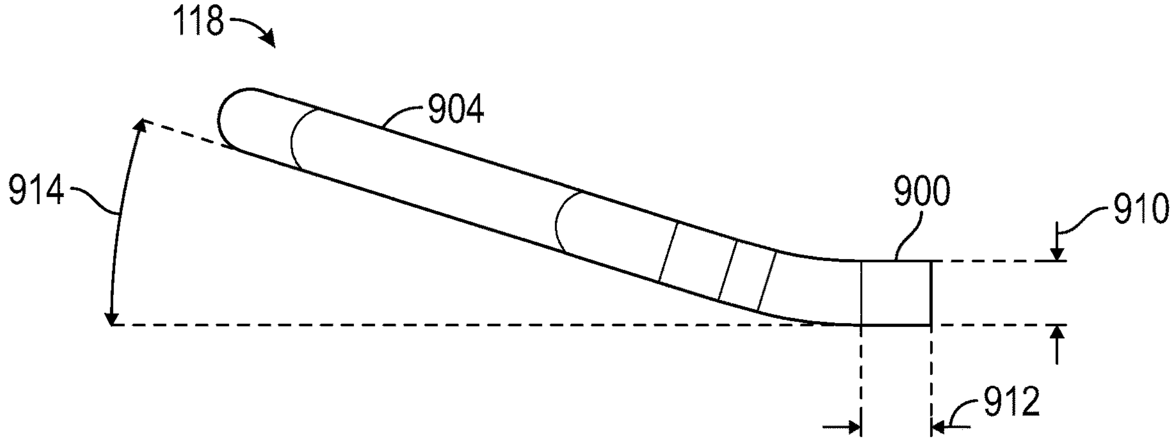
FIG. 9B is a side view of a hook in one example.

FIGS. 9A-9B show dimensions of the second hook 118. As illustrated in FIG. 9A, the second hook 118 may have two ends and a U-shaped portion. The second hook 118 may have a first straight end 900, a second straight end 902, and a U-shaped portion 904. The U-shaped portion 904 of the second hook 118 may extend out from the first straight end 900 and the second straight end 902 of the second hook 118 at a second hook horizontal offset angle 906 of about 10 degrees, about 15 degrees, about 20 degrees, about 25 degrees, about 30 degrees, about 35 degrees, about 40 degrees, about 45 degrees, about 50 degrees, about 55 degrees, or about 60 degrees. In an example, the second hook horizontal offset angle may be about 10 inches to about 20 inches, about 20 inches to about 30 inches, about 30 inches to about 40 inches, about 40 inches to about 50 inches, or about 50 inches to about 60 inches. The second hook maximum width 908 of the second hook 118 (e.g., the distance between the first straight end and the second straight end of the second hook) may be about 2 inches, about 2.5 inches, about 3 inches, about 3.5 inches, about 4 inches, about 4.5 inches, about 5 inches, about 5.5 inches, or about 6 inches. In an example, the second hook maximum width 908 may be about 2 inches to about 2.5 inches, about 2.5 inches to about 3 inches, about 3 inches to about 3.5 inches, about 3.5 inches to about 4 inches, about 4 inches to about 4.5 inches, or about 4.5 inches to about 5 inches. In an example, the second hook horizontal offset angle 906 may be about 22.5 degrees and the second hook maximum width 908 may be about 4.47 inches.

As illustrated in FIG. 9B, the second hook 118 may have a second hook material diameter 910. The second hook material diameter 910 may be 0.3 inches, about 0.4 inches, about 0.5 inches, about 0.6 inches, about 0.7 inches, about 0.8 inches, about 0.9 inches, or about 1 inch. In an example, the second hook material diameter 910 may be about 0.3 inches to about 0.6 inches or about 0.6 inches to about 1 inch. The second hook 118 may have a second hook straight end length 912. The second hook straight end length 912 may be about 0.5 inches, about 0.75 inches, about 1 inch, about 1.25 inches, about 1.5 inches, about 1.75 inches, or about 2 inches. In an example, the second hook straight end length 912 may be about 0.5 inches to about 1 inch, about 1 inch to about 1.5 inches, or about 1.5 inches to about 2 inches. The second hook 118 may have a second hook elevation angle 914 (e.g., between the straight ends 900, 902 and the U-shaped portion 904). The second hook 118 may have a second hook elevation angle 914 about 10 degrees, about 15 degrees, about 20 degrees, about 25 degrees, about 30 degrees, about 35 degrees, about 40 degrees, about 45 degrees, about 50 degrees, about 55 degrees, or about 60 degrees. In an example the second hook elevation angle 914 may be about 10 degrees to about 20 degrees, about 20 degrees to about 30 degrees, about 30 degrees to about 40 degrees, about 40 degrees to about 50 degrees, or about 50 degrees to about 60 degrees. In an example, the second hook material diameter 910 may be about 0.5 inches, the second hook straight end length 912 may be about 0.53 inches, and the second hook elevation angle 914 may be about 17.5 degrees.

Figure 10A:
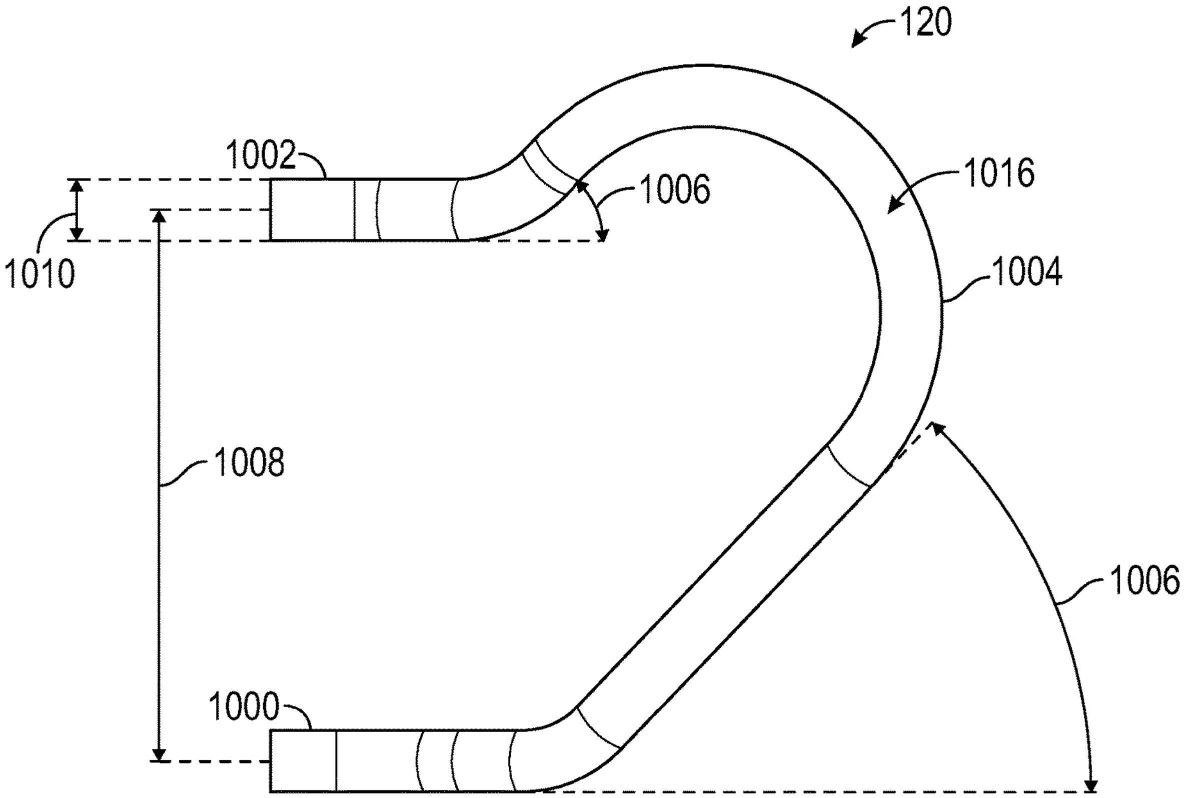
FIG. 10A is a top view of a hook in one example.
Figure 10B:
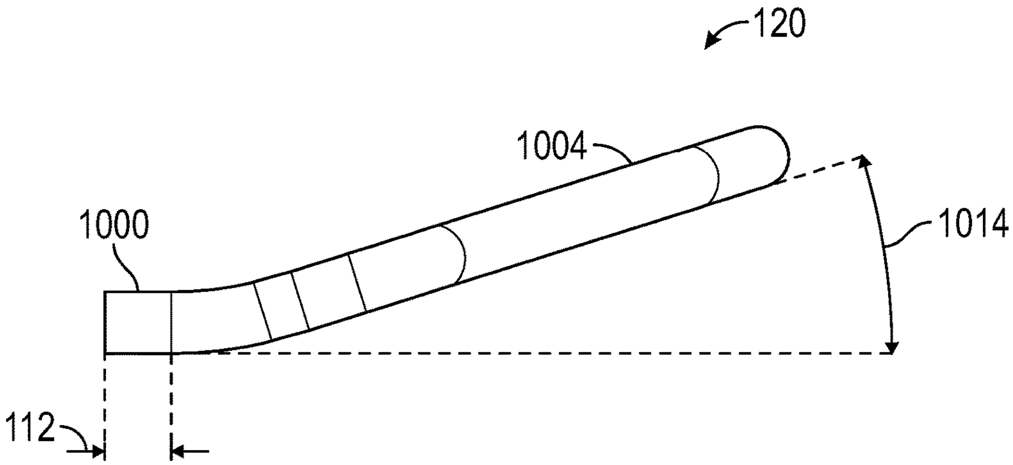
FIG. 10B is a side view of a hook in one example.

FIGS. 10A-10B show dimensions of the third hook 120. As illustrated in FIG. 9A, the third hook 120 may have two ends and a U-shaped portion. The third hook 120 may have a first straight end 1000, a second straight end 1002, and a U-shaped portion 1004. The U-shaped portion 1004 of the third hook 120 may extend out from the first straight end 1000 and the second straight end 1002 of the third hook 120 at a third hook horizontal offset angle 1006 of about 10 degrees, about 15 degrees, about 20 degrees, about 25 degrees, about 30 degrees, about 35 degrees, about 40 degrees, about 45 degrees, about 50 degrees, about 55 degrees, or about 60 degrees. In an example the third hook horizontal offset angle 1006 may be about 10 degrees to about 20 degrees, about 20 degrees to about 30 degrees, about 30 degrees to about 40 degrees, about 40 degrees to about 50 degrees, or about 50 degrees to about 60 degrees. The third hook maximum width 1008 of the third hook 120 (e.g., the distance between the first straight end and the second straight end of the third hook) may be about 2 inches, about 2.5 inches, about 3 inches, about 3.5 inches, about 4 inches, about 4.5 inches, about 5 inches, about 5.5 inches, or about 6 inches. In an example, the third hook maximum width 1008 may be about 2 inches to about 2.5 inches, about 2.5 inches to about 3 inches, about 3 inches to about 3.5 inches, or about 3.5 inches to about 4 inches. The third hook 120 may have a third hook material diameter 1010. The third hook material diameter 1010 may be 0.3 inches, about 0.4 inches, about 0.5 inches, about 0.6 inches, about 0.7 inches, about 0.8 inches, about 0.9 inches, or about 1 inch. In an example, the third hook material diameter 1010 may be about 0.3 inches to about 0.6 inches or about 0.6 inches to about 1 inch. In an example, the third hook horizontal offset angle 1006 may be about 22.5 degrees, the third hook maximum width 1008 may be about 4.47 inches, and the third hook material diameter 1010 may be 0.50 inches.

As illustrated in FIG. 10B, the third hook 120 may have a third hook straight end length 1012. The third hook straight end length 1012 may be about 0.5 inches, about 0.75 inches, about 1 inch, about 1.25 inches, about 1.5 inches, about 1.75 inches, or about 2 inches. In an example, the third hook straight end length 1012 may be about 0.5 inches to about 1 inch, about 1 inch to about 1.5 inches, or about 1.5 inches to about 2 inches. The third hook 120 may have a third hook elevation angle 1014 (e.g., between the straight ends 1000, 1002 and the U-shaped portion 1004). The third hook 120 may have a third hook elevation angle 1014 of about 10 degrees, about 15 degrees, about 20 degrees, about 25 degrees, about 30 degrees, about 35 degrees, about 40 degrees, about 45 degrees, about 50 degrees, about 55 degrees, or about 60 degrees. In an example, the third hook elevation angle 1014 may be about 10 degrees to about 20 degrees, about 20 degrees to about 30 degrees, about 30 degrees to about 40 degrees, about 40 degrees to about 50 degrees, or about 50 degrees to about 60 degrees. In an example, the third hook straight end length 1012 may be about 0.53 inches and the third hook elevation angle 1014 may be about 17.5 degrees.

In some embodiments, as illustrated, for example, in FIG. 10A, the U-shaped portion 904 of the second hook 118 and the U-shaped portion 1004 of the third hook 120 may have a radius 1016 of about 1 inch, about 1.25 inches, about 1.5 inches, about 1.75 inches, about 2 inches, about 2.25 inches, about 2.5 inches, about 2.75 inches, or about 3 inches. In an example, the radius 1016 may be about 1 inch to about 1.5 inches, about 1.5 inches to about 2 inches, about 2 inches to about 2.5 inches, or about 2.5 inches to about 3 inches. In an example, the U-shaped portion 904 of the second hook 118 and the U-shaped portion 1004 of the third hook 120 may have a radius 1016 of 1.75 inches.

As illustrated in FIG. 11, the device 100 may include two hooks, a first hook 116 and a second hook 118. The first hook 116 may be attached to the cap 110 on the proximal end 114 of the body 102 and the second hook 118 may be attached to a hook attachment 1104 near the distal end 112 of the body 102. As illustrated in FIG. 11, the first hook 116 and the second hook 118 may be U-shaped hooks. In an example, the first hook 116 and the second hook 118 may be operable to move up and down at their respective ends to more easily be hooked by a Pike pole or New York hook. The first hook 116 may include a first downward bend 1106 and a second downward bend 1108 to prevent the U-shaped portion 1114 of the first hook 116 from contacting the ground. The second hook 118 may include a first downward bend 1110 and a second downward bend 1112 to prevent the U-shaped portion 1116 of the second hook 1118 from contacting the ground. By preventing the front ends of the first hook 116 and the second hook 118 from directly contacting the ground, a Pike pole or a New York hook will easily be able to hook on to the first hook 116 and/or the second hook 118.

Figure 16A:
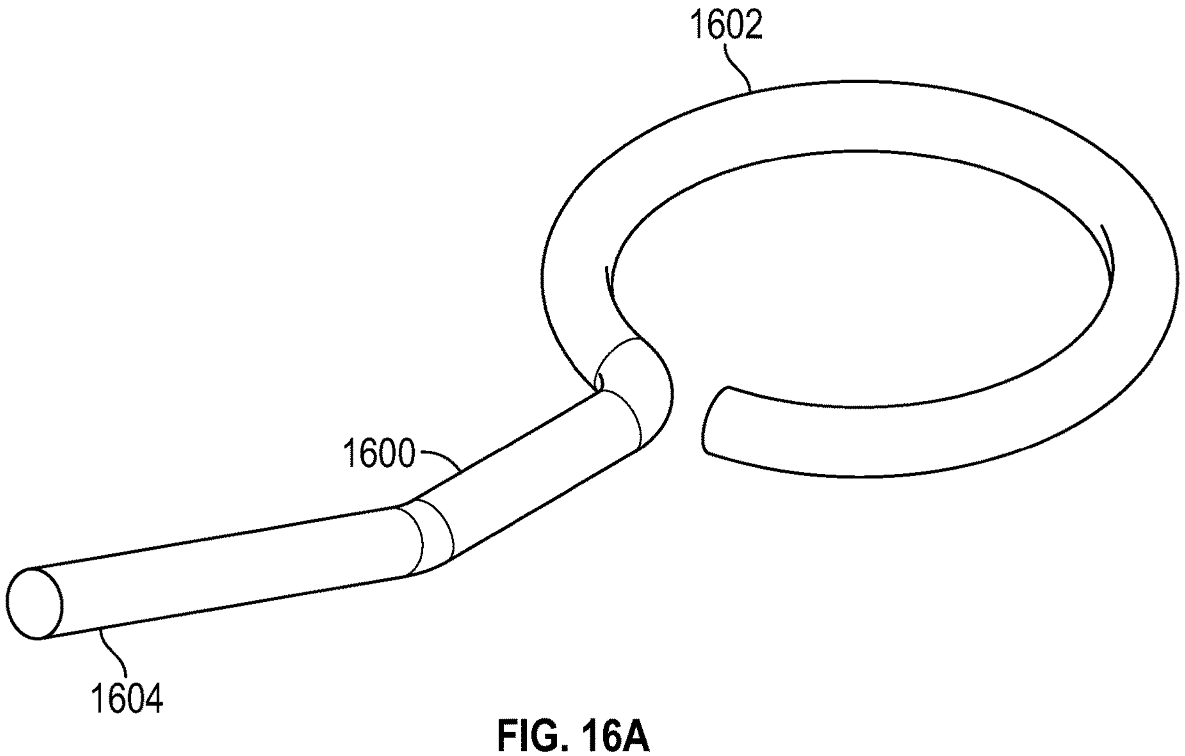
FIG. 16A is an isometric view of a hook in one example.
Figure 16B:
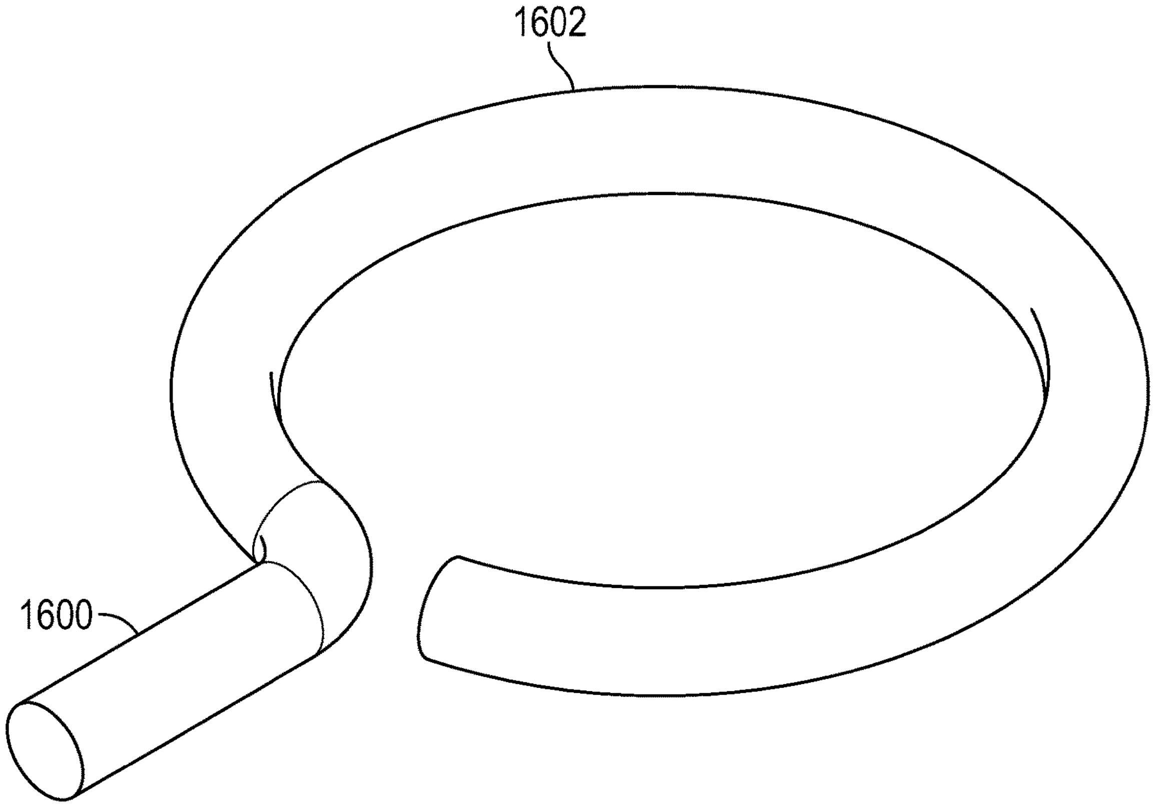
FIG. 16B is an isometric view of a hook in one example.

As illustrated in FIGS. 13, 16A, and 16B, the first hook 116, second hook 118, and third hook 120 may be eye-shaped hooks. The eye-shaped hooks may have a straight portion 1600, an eye portion 1602, and a connection portion 1604. The connection portion 1604 of the second hook 118 and the third hook 120 may be connected to a first nest support 1300 near the distal end 112 of the body 102. The connection portion 1604 of the first hook 116 may be connected to the cap 110 in the first hook hole 400. The straight portion 1600 may have a length of about 1 inch, 1.5 inches, 2 inches, 2.5 inches, 3 inches, 3.5 inches, 4 inches, 4.5 inches, 5 inches, 5.5 inches, or 6 inches. In an example, the straight portion 1600 may have a length of about 1 inch to about 2 inches, about 2 inches to about 3 inches, about 3 inches to about 4 inches, about 4 inches to about 5 inches, or about 5 inches to about 6 inches. The eye portion 1602 may have a diameter of about 1 inch, 1.5 inches, 2 inches, 2.5 inches, 3 inches, 3.5 inches, 4 inches, 4.5 inches, 5 inches, 5.5 inches, or 6 inches. In an example, the eye portion 1602 may have a diameter of about 1 inch to about 2 inches, about 2 inches to about 3 inches, about 3 inches to about 4 inches, about 4 inches to about 5 inches, or about 5 inches to about 6 inches. The connection portion 1604 may have a length of about 1 inch, 1.5 inches, 2 inches, 2.5 inches, 3 inches, 3.5 inches, 4 inches, 4.5 inches, 5 inches, 5.5 inches, or 6 inches. In an example, the connection portion 1604 may have a length of about 1 inch to about 2 inches, about 2 inches to about 3 inches, about 3 inches to about 4 inches, about 4 inches to about 5 inches, or about 5 inches to about 6 inches.

In an embodiment, the first hook 116, second hook 118, and third hook 120 are configured to be hooked on to by a New York hook or Pike pole. The dimensions, as described above, of the first hook 116, second hook 118, and the third hook 120 are optimized for ease of use with a New York hook or a Pike pole. The first hook 116, second hook 118, and third hook 120 can be hooked on to by a New York hook or a Pike pole to maneuver the device 100 underneath a vehicle or other burning object to supply water to the underside of a vehicle or burning object.

In a further embodiment, the hooks may be a J-shaped hook or another type of hook. In an example, the hooks may be any hook capable of being hooked on to by a New York hook or a Pike pole. In an example, the hooks may be operable to be hooked on to by a New York hook or Pike pole to maneuver the device 100 underneath a burning vehicle or other burning object. By maneuvering the device 100 underneath a vehicle or other burning object, water may be applied directly to the underside of the vehicle or burning object.

In additional embodiments, the hooks may be made of steel, titanium, or aluminum. In an example, the hooks may be made of round bar steel. In a further example, the hooks may be made of round tube steel.

Figure 17:
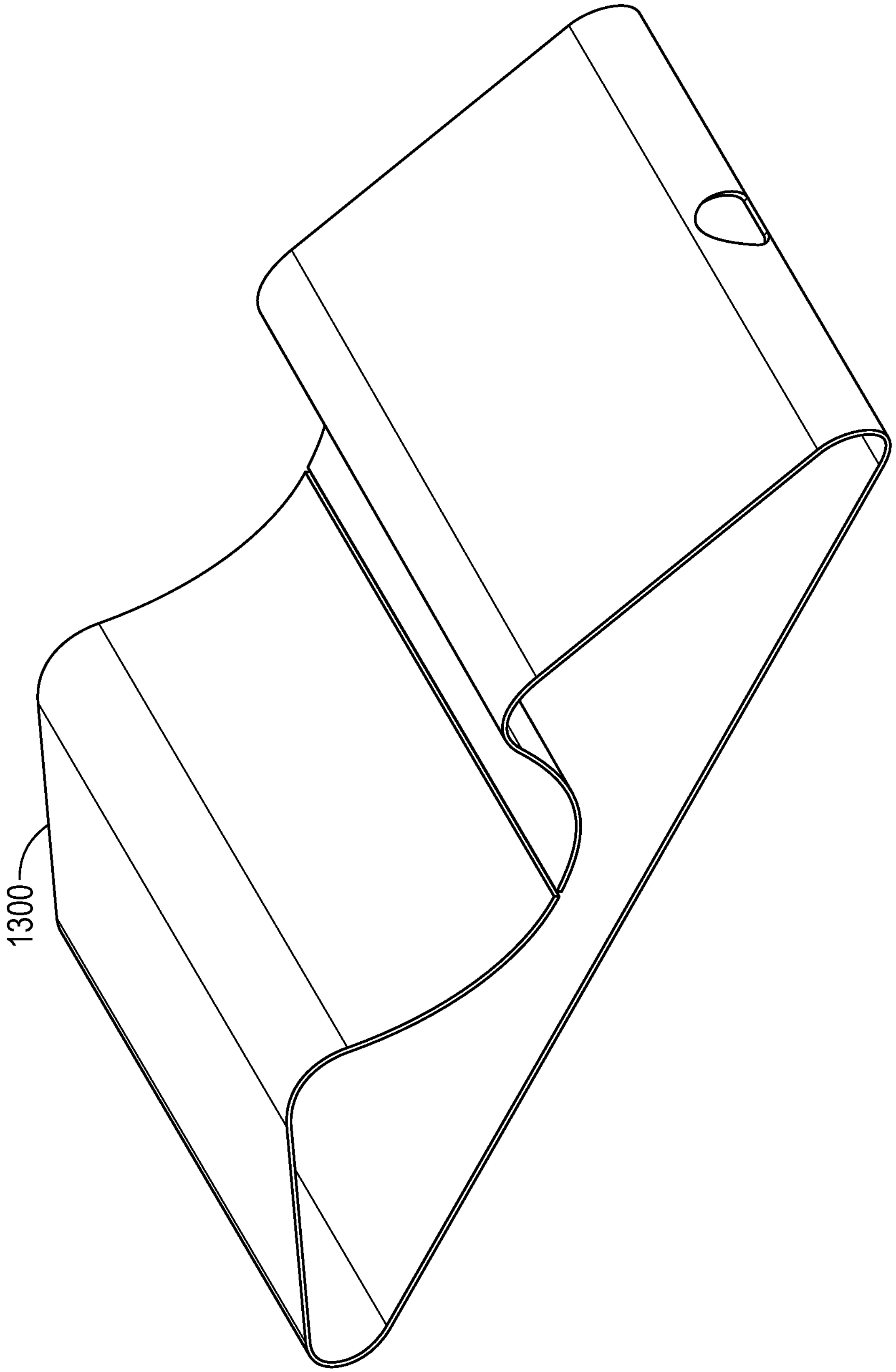
FIG. 17 is an isometric view of a nest support in one example.

In some embodiments, as illustrated in FIGS. 13 and 17, the device 100 may include a first nest support 1300, a second nest support 1304, and a third nest support. The nest supports may be operable to hold the device 100 in place when the device 100 is in operation (e.g. water is flowing through it). In an example, the first nest support 1300 may be connected to the body 102 near the distal end 112 of the body 102. The second nest support 1304 may be connected to a middle portion of the body 102. The third nest support 1306 may be connected to the body 102 near the proximal end 114 of the body 102.

In another embodiment, a chain or a rope may be attached to the first hook. In an example, the chain may be made of steel, titanium, or aluminum. The rope may be made of a heat resistant rope with a heat resistance up to 4000 degrees Fahrenheit. The chain or rope may be operable to be thrown underneath a vehicle or other burning object. The chain or rope may be configured to be grasped on the opposite side of the vehicle or burning object to maneuver the appliance underneath the vehicle or the object.

In a further embodiment, the device 100 may have a width (e.g. perpendicular to the longitudinal axis 200) of about 3 inches, about 4 inches, about 5 inches, about 6 inches, about 7 inches, about 8 inches, about 9 inches, or about 10 inches. In an example, the device 100 may have a width of about 3 inches to about 6 inches or about 6 inches to about 10 inches. The device 100 may have a length (e.g. along the longitudinal axis 200) of about 42 inches, about 43 inches, about 44 inches, about 45 inches, about 46 inches, about 47 inches, about 48 inches, about 49 inches, or about 50 inches. In an example, the device 100 may have a length of about 35 inches to about 40 inches, about 40 inches to about 45 inches, or about 45 inches to about 50 inches. The device 100 may have a maximum height (e.g. along the vertical axis 202) of about 1 inch, about 1.5 inches, about 2 inches, about 2.5 inches, about 3 inches, about 3.5 inches, or about 4 inches. In an example, the device 100 may have a maximum height of about 1 inch to about 2 inches, about 2 inches to about 3 inches, or about 3 inches to about 4 inches. In another example, the device 100 may have a maximum height less than the space beneath a vehicle or other burning object. In an example, the device 100 may have a width of about 6 inches, a length of about 48 inches, and a height of about 2.25 inches. The dimensions of the device 100 may be configured to allow the device 100 to traverse the width of a vehicle from side to side (e.g., the mid-section of the vehicle, meaning the section of the vehicle between the front and rear tires) with the hose laying perpendicular to the vehicle side. Further, the dimensions of the device 100 may be configured to allow the device to be maneuvered underneath the vehicle when the vehicle's tires have deflated or exploded due to heat from a fire.

In an additional embodiment, the device 100 may have a weight of about 20 pounds, about 25 pounds, about 30 pounds, about 35 pounds, about 40 pounds, about 45 pounds, about 50 pounds, about 55 pounds, about 60 pounds, about 65 pounds, about 70 pounds, about 75 pounds, about 80 pounds, about 85 pounds, about 90 pounds, about 95 pounds, or about 100 pounds. In an example, the device 100 may have a weight of about 25 pounds to about 50 pounds, about 50 pounds to about 75 pounds, or about 75 pounds to about 100 pounds. In an example, the device 100 may have a weight under 50 pounds, such that the device 100 may be operated by a single person. Since only one person is necessary to operate the device 100, other personnel (e.g., firefighters) may be able to provide water to the top of a vehicle or a burning object using traditional fire lines.

Figure 12:
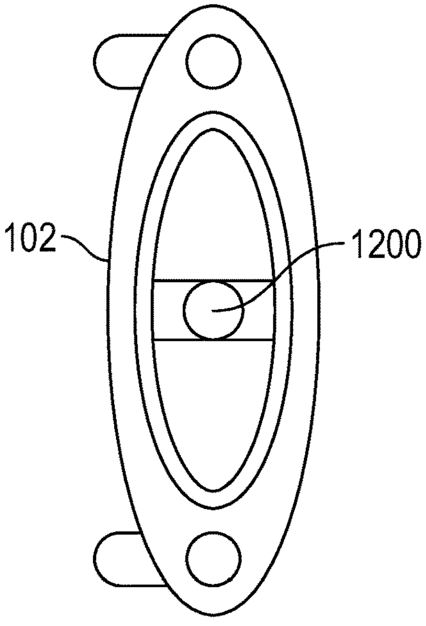
FIG. 12 is a cross-section of a body in one example.

As illustrated in FIG. 12, the device 100 may have an inner support baffle 1200 within the body 102. The inner support baffle 1200 may be made of the same material as the body 102. In another example, the support baffle may be made of a different material than the body. The inner support baffle 1200 may be bolted onto the top and bottom of the inside of the body 102 to maintain the body's shape while under pressure from the water running through the body 102, from the heat of a fire, or from the weight of a vehicle or other burning object. In a further example, the inner support baffle 1200 may be welded onto the top and bottom of the inside of the body 102. In an addition example, the inner support baffle 1200 may be formed when the body 102 is formed using common manufacturing processes.

In additional embodiments, the device 100 may further include a protective coating. In an example, the device 100 may be coated with a protective coating configured to be heat resistant up to about 2000 degrees Fahrenheit, about 2500 degrees Fahrenheit, about 3000 degrees Fahrenheit, about 3500 degrees Fahrenheit, of about 4000 degrees Fahrenheit. In an example, the protective coating may be heat resistant up to about 2000 degrees Fahrenheit to about 2500 degrees Fahrenheit, about 2500 degrees Fahrenheit to about 3000 degrees Fahrenheit, about 3000 degrees Fahrenheit to about 3500 degrees Fahrenheit, or about 3500 degrees Fahrenheit to about 4000 degrees Fahrenheit. The protective coating may also prevent corrosion. In an example, the protective coating may be a ceramic-based coating. In a further example, the inside of the device 100 may be coated with an aerosol protective coating to prevent corrosion.

In a further embodiment, the device 100 may be operable to extinguish a fire from underneath an object, prevent thermal runaway from underneath an object, or reduce the heat of a fire from underneath an object. In an example, the device 100 is operable to deliver a volume of water at a given pressure. In one example, the device may deliver 700 gallons of water per minute at a water source pressure of 75 pounds per square inch ("psi"). In another example, the device may deliver about 450 gallons of water per minute at a water source pressure of 50 psi. In a further example, the device may deliver about 1750 gallons per minute at a water source pressure of about 150 psi. In an example, the device 100 may deliver about 300 gallons of water per minute to about 600 gallons of water per minute, about 600 gallons of water per minute to about 900 gallons of water per minute, about 900 gallons of water per minute to about 1200 gallons of water per minute, about 1200 gallons of water per minute to about 1500 gallons of water per minute, or about 1500 gallons of water per minute to about 1800 gallons of water per minute. In an example, the water source pressure may be about 25 psi to about 50 psi, about 50 psi to about 75 psi, about 75 psi to about 100 psi, about 100 psi to about 125 psi, or about 125 psi to about 150 psi.

In an embodiment, the adapter 1800 (as illustrated, for example in FIG. 18) may be connected to a hose to supply water to the device 100. Water may flow through the adapter 1800 to the neck 106 and out through the plurality of holes 104. Water may be dispersed upward through the plurality of holes 104 into the underside of an electric vehicle battery, any other type of vehicle, or any burning object. The water may be forced through the body 102 and out the plurality of holes 104 due to the pressure of the water supply.

In typical situations, when there is a BEV fire, the tires deflate or explode and the vehicle rests on the wheels, leaving little room under the vehicle for an appliance to maneuver. This situation makes it difficult for firefighters or a person attempting to put out a fire to access the underside of vehicle and therefore the burning battery. Thus, the dimensions of the device, as described above, make it simple for a single person or firefighter to maneuver the device underneath the vehicle. The device may be placed on one side of the vehicle with the hose connection perpendicular to the vehicle side (e.g., the portion of the vehicle between the front and rear tires on one side of the vehicle). The device may then be hooked on to by a Pike pole or New York hook from the other side of the vehicle on one or more of the hooks and maneuvered underneath the vehicle directly below the battery. The device may disperse about 450 gallons per minute to about 1750 gallons per minute to the underside of the battery through the plurality of holes, thereby preventing thermal runaway. When used in conjunction with a traditional vehicle fire line, BEV fires will be extinguished more quickly, and with less water, as compared to standard firefighting tools and tactics.

In a further embodiment, the device may be used to extinguish or cool a fire underneath a burning object. For example, there may be a need to provide water to the underside of a propane tank. The device may be maneuvered under the propane tank using a Pike pole or New York hook, thereby providing water to the underside of the propane tank and more quickly extinguishing the fire. The device may be used in other similar situations where water is needed underneath a burning object.

Also described herein is a method for using the appliance to prevent thermal runaway of a BEV fire. The method may include connecting the device to a hose using distal female threaded end of the adapter. At a second step, the method may include maneuvering the device under a vehicle by hooking on to one or more of the hooks using a New York hook or a Pike Pole. Alternatively, the second step of maneuvering the device under a vehicle may include attaching a chain or a rope to the first hook, throwing the chain or rope under the vehicle and through to the other side of the vehicle, and grasping the chain or the rope to maneuver the device underneath the vehicle. At a third step, the method may include dispersing water to the underside of the vehicle through the plurality of holes in the body. At a fourth step, the method may further include dispersing water to the top of the vehicle using a traditional fire line.

Also described herein is a method for using the device to provide water to the underside of a burning object. The method may include connecting the device to a hose using the distal female threaded end of the adapter. At a second step the method may include maneuvering the device under the burning object by hooking on to one or more of the hooks using a New York hook or a Pike Pole. Alternatively, the second step of maneuvering the device under a burning object may include attaching a chain or a rope to the first hook, throwing the chain or rope under the burning object and through the other side of the burning object, and grasping the chain or rope to maneuver the device underneath the burning object. At a third step, the method may include dispersing water to the underside of the burning object through the plurality of holes in the body. At a fourth step, the method may further include dispersing water to the top of the burning object using a traditional fire line.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

Exemplary Embodiments

The following is a list of non-limiting exemplary embodiments and may include combinations thereof.

Embodiment 1: A device for extinguishing a fire or preventing thermal runaway comprising: a first coupling having a first end and a second end; a second coupling having a first end and a second end; a body comprising: a first end, a second end, and a plurality of holes operable to disperse water; one or more hooks; wherein the first end of the first coupling is operable to removably couple to a fire hose, wherein the second end of the first coupling is operable to couple to the first end of the second coupling, and wherein the second end of the second coupling is attached to the first end of the body.

Embodiment 2: The device of embodiment 1, wherein the one or more hooks are U-shaped hooks.

Embodiment 3: The device of embodiment 2, wherein the device further comprises a first hook, a second hook, and a third hook.

Embodiment 4: The device of embodiment 3, wherein the first hook has a first end and a second end, wherein the first end and the second end are attached to the second end of the body.

Embodiment 5: The device of embodiment 4, wherein the first hook is attached to the body at an incline of about 10 degrees to about 45 degrees.

Embodiment 6: The device of embodiment 3, wherein the second hook has a first end attached to the body and a second end attached to the second coupling.

Embodiment 7: The device of embodiment 3, wherein the third hook has a first end attached to the body and a second end attached to the second coupling.

Embodiment 8: The device of embodiment 6, wherein the first end and the second end of the second hook are offset by about 0 degrees to about 45 degrees.

Embodiment 9: The device of embodiment 7, wherein the first end and the second end of the third hook are offset by about 0 degrees to about 45 degrees.

Embodiment 10: The device of embodiment 1, wherein the second end of the second coupling is welded on to the first end of the body.

Embodiment 11: The device of embodiment 1, wherein the first coupling is a female swivel coupling.

Embodiment 12: The device of embodiment 1, wherein the first end of the second coupling is a male threaded end.

Embodiment 13: The device of embodiment 1, wherein the device has a width of about 6 inches, a height of about 1.75 inches, and a length of about 48 inches.

Embodiment 14: The device of embodiment 1, wherein the body comprises steel, aluminum, or titanium.

Embodiment 15: The device of embodiment 1, wherein the first end of the body has an incline of about 10 to about 45 degrees.

Embodiment 16: The device of embodiment 1, wherein the device weights about 25 to about 50 pounds.

Embodiment 17: The device of embodiment 1, wherein the first end of the female coupling is operable to removably couple to a fire hose having a diameter of about 2.5 inches to about 3 inches.

Embodiment 18: The device of embodiment 3, wherein the hooks are welded to the device.

Embodiment 19: The device of embodiment 1, wherein the device is configured to deliver about 700 gallons of water per minute to the underside of a vehicle at a pressure of 75 psi.

Embodiment 20: The device of embodiment 3, wherein the hooks are operable to be hooked by a Pike pole or New York hook.

Embodiment 21: The device of embodiment 3, further comprising a chain removably attached to the first hook.

Embodiment 22: The device of embodiment 1, wherein the plurality of holes comprises 113 holes.

Embodiment 23: The device of embodiment 22, wherein the plurality of holes comprises a first column having 22 holes, a second column having 21 holes, a third column having 22 holes, a fourth column having 21 holes, and a fifth column having 22 holes.

Embodiment 24: The device of embodiment 1, wherein the device is coated in a protective coating.

Embodiment 25: The device of embodiment 24, wherein the protective coating is heat resistant up to 4000 degrees Fahrenheit.

Embodiment 26: The device of embodiment 25, wherein the protective coating is operable to prevent corrosion.

Embodiment 27: The device of embodiment 23, wherein the first column of holes and the fifth column of holes have an offset of 40 degrees, and wherein the offset is configured to disperse water distal to the body.

Embodiment 28: The device of embodiment 23, wherein the second column of holes and fourth column of holes have an offset of 20 degrees, and wherein the offset is configured to disperse water distal to the body.

Embodiment 29: The device of embodiment 23, wherein the third column of holes has an offset of 0 degrees, and wherein the offset is configured to disperse water 90 degrees in an upward direction.

Embodiment 30: The device of embodiment 2, wherein the U-shape hook has a length of about 5 inches.

Embodiment 31: The device of embodiment 1, further comprising a filter connected to the first end of the first coupling, wherein the filter is operable to remove any particles from the water.

Embodiment 32: The device of embodiment 1, wherein the body is rectangular or tubular.

Embodiment 33: The device of embodiment 1, wherein each hole in the plurality of holes has a diameter of 0.1825 inches.

Embodiment 34: The device of embodiment 1, wherein the one or more hooks comprise round bar steel.

Embodiment 35: The device of embodiment 1, wherein the one or more hooks comprise round tube steel.

Embodiment 36: The device of embodiment 1, wherein the body further comprises an inner support baffle.

Embodiment 37: The device of embodiment 1, wherein the first coupling and the second coupling comprise steel, aluminum, or titanium.

Embodiment 38: The device of embodiment 1, wherein the second coupling is schedule 10 pipe, schedule 40 pipe, or schedule 80 pipe.

Embodiment 40: A method of extinguishing an electric vehicle fire or preventing thermal runaway, the method comprising: connecting the device of claim 1 to a firehose using the first coupling; maneuvering the device of claim 1 under a vehicle using a Pike pole or New York hook hooked on to the one or more hooks; dispersing water to an underside of the vehicle through the plurality of holes on the body; and dispersing water to an upper side of the vehicle using a traditional fire line.

What is claimed is:

1. A device for extinguishing a fire comprising:
a body comprising:
a neck having male threading at a distal end of the body;
a cap at a proximal end of the body;
a plurality of holes operable to disperse water wherein:
a first column of the plurality of holes has an angular offset of 40 degrees from a vertical axis;
a second column of the plurality of holes has an angular offset of 20 degrees from the vertical axis;
a third column of the plurality of holes has no angular offset from the vertical axis;
a fourth column of the plurality of holes has an angular offset of 20 degrees from the vertical axis;
a fifth column of the plurality of holes has an angular offset of 40 degrees from the vertical axis;
a first hook connected to the cap at the proximal end of the body comprising:
two ends connected to and extending out from the cap;
a U-shaped portion extending out from the two ends;
a second hook connected to a first longitudinal side of the body near the distal end of the body comprising:
two ends attached to the first longitudinal side of the body near the distal end and extending out from the first longitudinal side of the body near the distal end of the body;
a U-shaped portion extending out from the two ends;
a third hook connected to a second longitudinal side of the body near the distal end comprising:
two ends connected to the second longitudinal side of the body near the distal end of the body and extending out from the second longitudinal side of the body near the distal end of the body; and
a U-shaped portion extending out from the two ends.

2. The device of claim 1, further comprising an adapter having a distal female threaded end and a proximal female threaded end.

3. The device of claim 2, wherein the distal female threaded end of the adapter is operable to removably couple to the male threading at the distal end of the body.

4. The device of claim 2, wherein the adapter is a female swivel coupling.

5. The device of claim 2, wherein distal female threaded end is operable to removably couple to a fire hosing having a diameter of about 2.5 inches to about 3 inches.

6. The device of claim 1, wherein the U-shaped portion of the first hook has a first hook elevation angle from the two ends of the first hook of about 15 degrees to about 30 degrees.

7. The device of claim 1, wherein the U-shaped portion of the second hook has a second hook elevation angle from the two ends of the second hook of about 15 degrees to about 30 degrees.

8. The device of claim 1, wherein the U-shaped portion of the third hook has a third hook elevation angle from the two ends of the third hook of about 15 degrees to about 30 degrees.

9. The device of claim 1, wherein the U-shaped portion of the second hook has a second hook horizontal offset angle from the two ends of the second hook of about 15 degrees to about 30 degrees.

10. The device of claim 1, wherein the U-shaped portion of the third hook has a third hook horizontal offset angle from the two ends of the third hook of about 15 degrees to about 30 degrees.

11. The device of claim 1, wherein the device has a width of about 6 inches, a height of about 2.25 inches, and a length of about 48 inches.

12. The device of claim 1, wherein the first column, third column, and fifth column have about 20 to 25 holes.

13. The device of claim 12, wherein the second column and fourth column have about 20 to 25 holes and the holes of the second column and fourth column are offset from the holes of the first column, third column, and fifth column.

14. The device of claim 1, wherein the device has a weight of about 25 pounds to about 50 pounds and is operable to be operated by one person.

15. The device of claim 1, wherein the first hook, second hook, and third hook are operable to be hooked on to by a Pike pole or New York hook.

16. The device of claim 1, further comprising an inner baffle support.

17. The device of claim 1, wherein the plurality of holes comprises 108 holes.

18. The device of claim 1, wherein the device is configured to deliver about 700 gallons of water per minute to an underside of a vehicle at a pressure of about 75 psi.

19. A device for extinguishing a fire comprising:

a body comprising:

a neck having male threading at a distal end of the body;

a cap at a proximal end of the body;

a plurality of holes operable to disperse water wherein:

a first column of the plurality of holes has an angular offset of 40 degrees from a vertical axis;

a second column of the plurality of holes has an angular offset of 20 degrees from the vertical axis;

a third column of the plurality of holes has no angular offset from the vertical axis;

a fourth column of the plurality of holes has an angular offset of 20 degrees from the vertical axis;

a fifth column of the plurality of holes has an angular offset of 40 degrees from the vertical axis;

a first hook connected to the cap at the proximal end of the body comprising:

two ends connected to the cap and extending out from the cap;

a U-shaped portion extending from the two ends having an elevation angle of about 15 degrees to about 30 degrees;

a second hook connected to a first longitudinal side of the body near the distal end of the body comprising:

two ends attached to the first longitudinal side of the body and extending out from the first longitudinal side of the body near the distal end of the body;

a U-shaped portion extending out from the two ends having a second hook elevation angle of about 15 degrees to about 30 degrees;

a third hook connected to a second longitudinal side of the body near the distal end of the body comprising:

two ends attached to a second longitudinal side of the body and extending out from the second longitudinal side of the body near the distal end of the body; and a U-shaped portion extending out from the two ends having a third hook elevation angle of about 15 degrees to about 30 degrees.

20. A device for extinguishing a fire comprising:

a body comprising:

a neck having male threading at a distal end of the body;

a cap at a proximal end of the body; and a plurality of holes operable to disperse water wherein:

a first column of the plurality of holes has an angular offset of 40 degrees from a vertical axis;

a second column of the plurality of holes has an angular offset of 20 degrees from the vertical axis;

a third column of the plurality of holes has no angular offset from the vertical axis;

a fourth column of the plurality of holes has an angular offset of 20 degrees from the vertical axis;

a fifth column of the plurality of holes has an angular offset of 40 degrees from the vertical axis;

the holes in the first column, third column, and fifth column being offset from the holes in the second column and fourth column;

a first hook connected to the cap at the proximal end of the body comprising:

two ends attached to and extending out from the cap; and a U-shaped portion extending from the two ends having a first hook elevation angle of about 15 degrees to about 30 degrees;

a second hook connected to a first longitudinal side of the body near the distal end of the body comprising:

two ends connected to the first longitudinal side of the body near the distal end of the body and extending out from the first longitudinal side of the body near the distal end of the body; and a U-shaped portion extending out from the two ends having a second hook elevation angle of about 15 degrees to about 30 degrees and a second hook horizontal offset angle of about 15 degrees to about 30 degrees;

a third hook connected to a second longitudinal side of the body near the distal end of the body comprising:

two ends connected to the second longitudinal side of the body near the distal end of the body and extending out from the second longitudinal side of the body near the distal end of the body; and a U-shaped portion extending out from the two ends having a third hook elevation angle of about 15 degrees to about 30 degrees and a third hook horizontal offset angle of about 15 degrees to about 30 degrees, wherein the device has a height of about 2.25 inches, a width of about 6 inches, and a length of about 48 inches.

* * * * *